United States Patent
Tanja et al.

(10) Patent No.: US 9,706,877 B2
(45) Date of Patent: *Jul. 18, 2017

(54) SYSTEM, PACKAGE, APPARATUS AND METHOD FOR DOSING COFFEE BEANS

(71) Applicant: Koninklijke Douwe Egberts B.V., Utrecht (NL)

(72) Inventors: Age Willem Tanja, Burgum (NL); Ivo van Os, Amersfoort (NL); Philippe Jacques van Camp, Utrecht (NL); Gerbrand Kristiaan de Graaff, Hillegom (NL)

(73) Assignee: Koninklijke Douwe Egberts B.V., Utrecht (NL)

(*) Notice: Subject to any disclaimer, the term of this patent is extended or adjusted under 35 U.S.C. 154(b) by 400 days.

This patent is subject to a terminal disclaimer.

(21) Appl. No.: 14/223,778

(22) Filed: Mar. 24, 2014

(65) Prior Publication Data
US 2014/0202581 A1 Jul. 24, 2014

Related U.S. Application Data

(60) Division of application No. 13/113,004, filed on May 20, 2011, now Pat. No. 8,783,164, which is a (Continued)

(30) Foreign Application Priority Data

Nov. 21, 2008 (NL) ...................................... 2002239
Apr. 6, 2009 (NL) ...................................... 2002720

(51) Int. Cl.
B65D 88/00 (2006.01)
A47J 42/50 (2006.01)
(Continued)

(52) U.S. Cl.
CPC ................. *A47J 42/50* (2013.01); *A23F 5/08* (2013.01); *A47J 31/42* (2013.01); *B65D 83/04* (2013.01);
(Continued)

(58) Field of Classification Search
CPC .. B65D 83/049; B65D 83/0409; B65D 83/06; G01F 11/18; B02C 2013/28672; B02C 2013/28618; B02C 13/286; A47J 31/42
(Continued)

(56) References Cited

U.S. PATENT DOCUMENTS 1,079,106 A  11/1913  Bussler
1,758,999 A   5/1930  Carns
(Continued)

FOREIGN PATENT DOCUMENTS

DE  1020070 51 385   4/2008
EP     0 409 759 A1   1/1991
(Continued)

OTHER PUBLICATIONS

English Translation of Notification of Reasons for Refusal for Japanese Patent Application No. 2011-537384, dated Oct. 24, 2013, 4 pages.
(Continued)

*Primary Examiner* — Reginald L Alexander
(74) *Attorney, Agent, or Firm* — Foley & Lardner LLP

(57) ABSTRACT

A system for dosing coffee beans, comprising a coffee bean package provided with walls enclosing an inner space for coffee beans, a coffee bean outlet for delivering coffee beans, and a coupling part for coupling and uncoupling the coffee bean package with an apparatus that is provided with a coffee bean grinder, and an at least partly movably arranged coffee bean receiving device for supplying coffee beans from the coffee bean package to the grinder, which coffee
(Continued)

bean receiving device is provided with a dosing space for being capable of containing a predetermined dose of coffee beans, wherein the coffee bean package prior to use in itself is closed off such that exposure of the coffee beans to ambient air is prevented, and the coffee bean receiving device is arranged to be guided through the coffee bean outlet into the inner space of the coffee bean package for letting coffee beans from the coffee bean package into the dosing space, and to guide the dosing space through the coffee bean outlet out of the inner space of the coffee bean package for supplying the dose of coffee beans from the dosing space to the grinder.

5 Claims, 21 Drawing Sheets

Related U.S. Application Data continuation of application No. PCT/NL2009/050710, filed on Nov. 23, 2009.

(51) Int. Cl.
    *B65D 88/54*      (2006.01)
    *A47J 31/42*      (2006.01)
    *G01F 11/18*      (2006.01)
    *A23F 5/08*      (2006.01)
    *B65D 83/04*      (2006.01)

(52) U.S. Cl.
    CPC .............. *B65D 88/54* (2013.01); *G01F 11/18* (2013.01); *B65D 2303/00* (2013.01)

(58) Field of Classification Search
    USPC .... 99/286; 222/185.1, 361, 366, 365, 368.1; 241/246, 247, 250, 259.1, 248
    See application file for complete search history.

(56) References Cited

U.S. PATENT DOCUMENTS

| | | | | | |
|---|---|---|---|---|---|
| 1,993,401 | A | * | 3/1935 | Dudley | ............... A47K 5/10 222/181.2 |
| 2,311,330 | A | * | 2/1943 | Dudley | ............... A47K 5/10 222/197 |
| 2,403,299 | A | * | 7/1946 | Pickin | ........................ 141/112 |
| 2,455,962 | A | * | 12/1948 | Wheeler | ............. B67D 3/02 222/365 |
| 4,703,687 | A | | 11/1987 | Wei | |
| 4,955,510 | A | | 9/1990 | Newnan | |
| 5,186,399 | A | | 2/1993 | Knepler et al. | |
| 5,437,396 | A | | 8/1995 | Russillo et al. | |
| 5,823,398 | A | | 10/1998 | Russillo et al. | |
| 5,845,857 | A | | 12/1998 | Haber et al. | |
| 7,273,005 | B2 | | 9/2007 | Turi | |
| 2008/0098901 | A1 | | 5/2008 | Lee | |

FOREIGN PATENT DOCUMENTS

| | | |
|---|---|---|
| EP | 0 766 943 A1 | 4/1997 |
| EP | 0 832 824 A2 | 4/1998 |
| FR | 1237209 A | 6/1960 |
| GB | 2 392 899 A | 3/2004 |
| JP | 57-194178 | 11/1982 |
| JP | 63-171526 | 7/1988 |
| JP | 64-001628 | 1/1989 |
| JP | 2003-265332 | 9/2003 |
| JP | 2008-161670 | 7/2008 |
| WO | WO-91/08960 A | 6/1991 |
| WO | WO-2006/090183 A | 8/2006 |

OTHER PUBLICATIONS

Extended European Search and Examination Report for European Application No. 12193324.6, dated Jul. 25, 2013, 12 pages.
International Search Report for PCT/NL2009/050710, date of mailing Jun. 8, 2010, 7 pages.

* cited by examiner

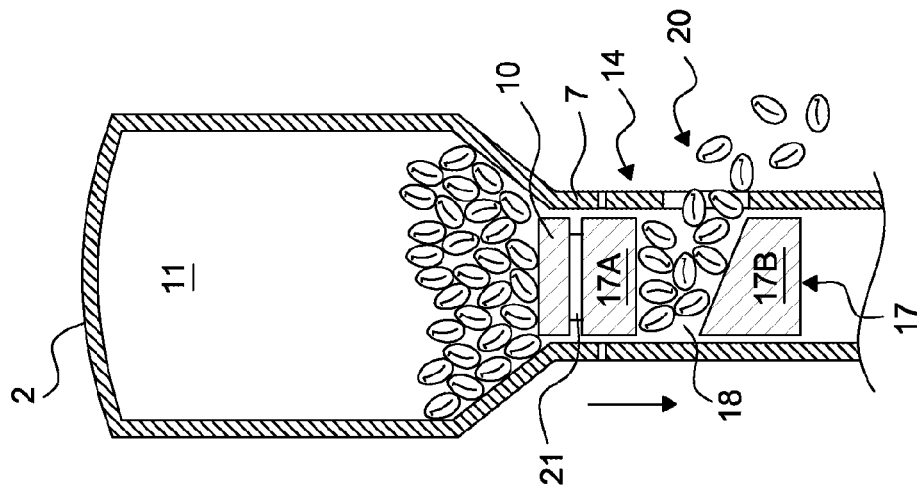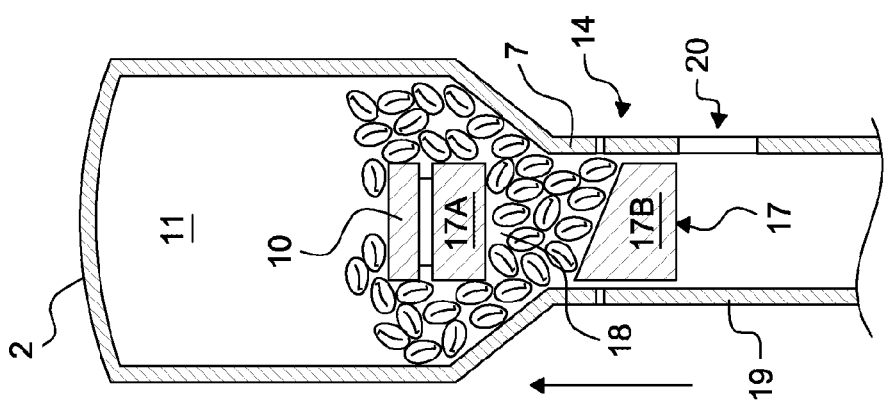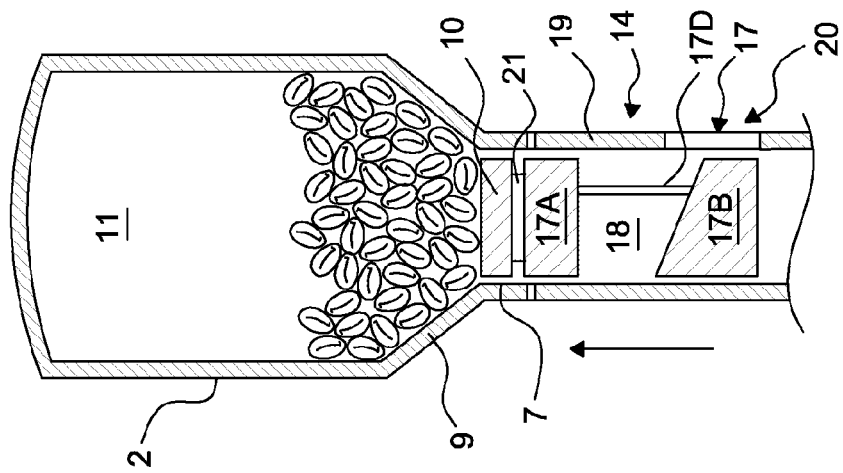

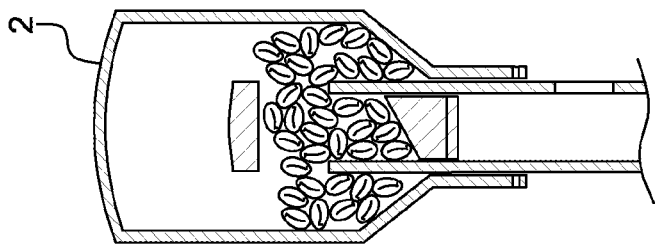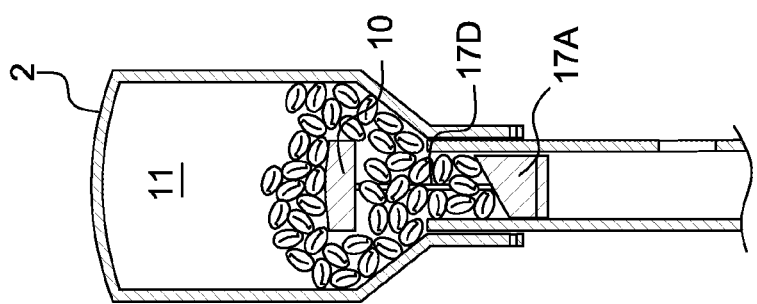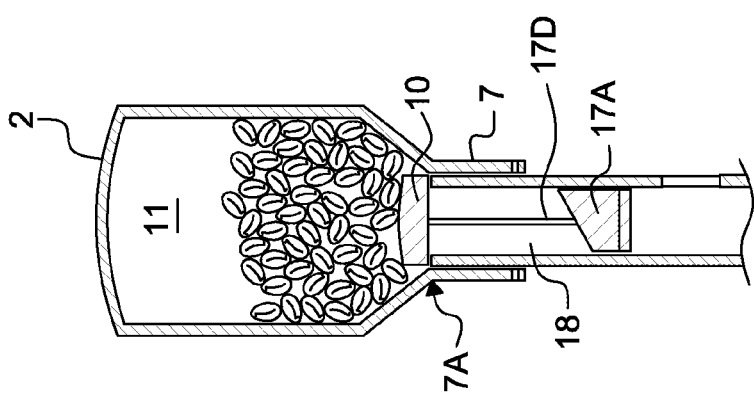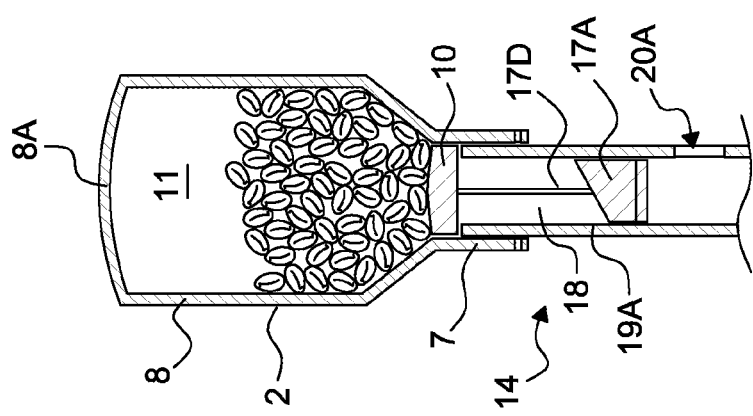

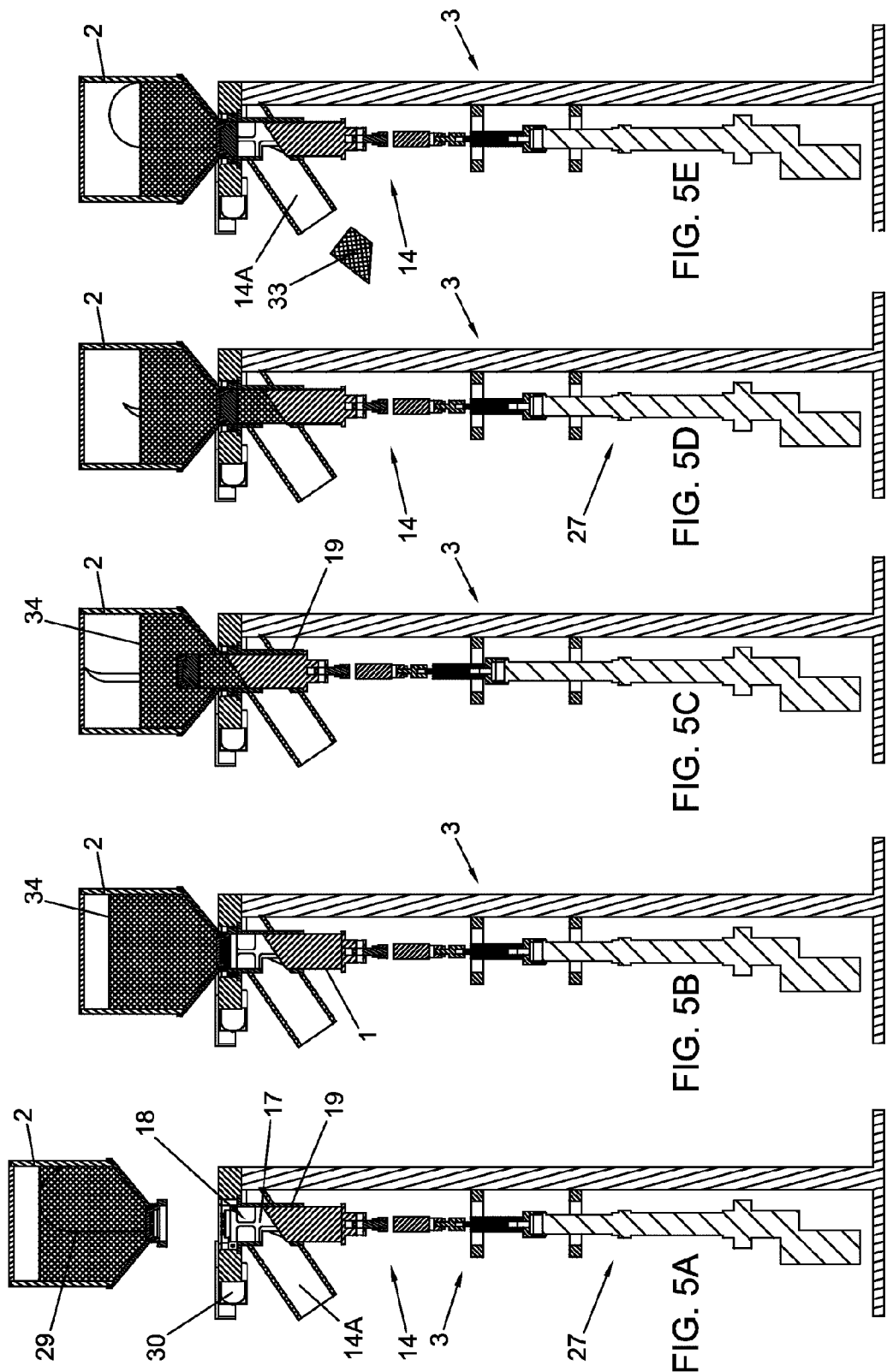

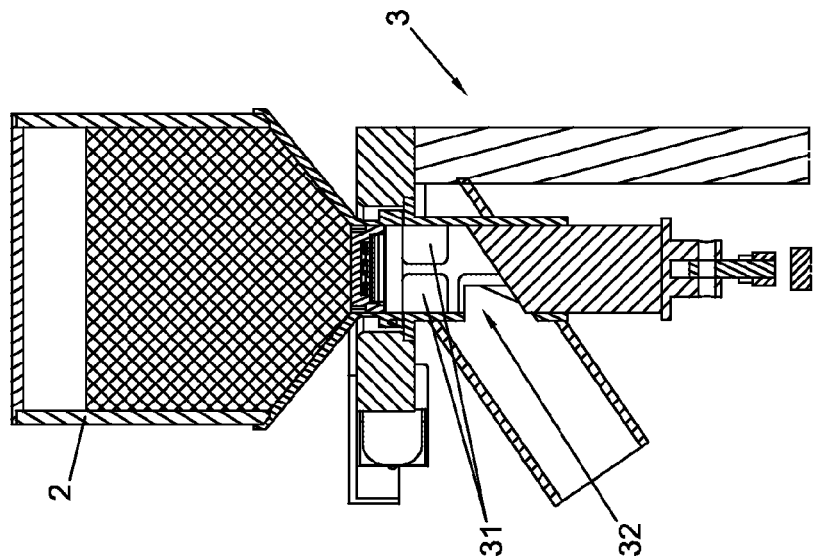
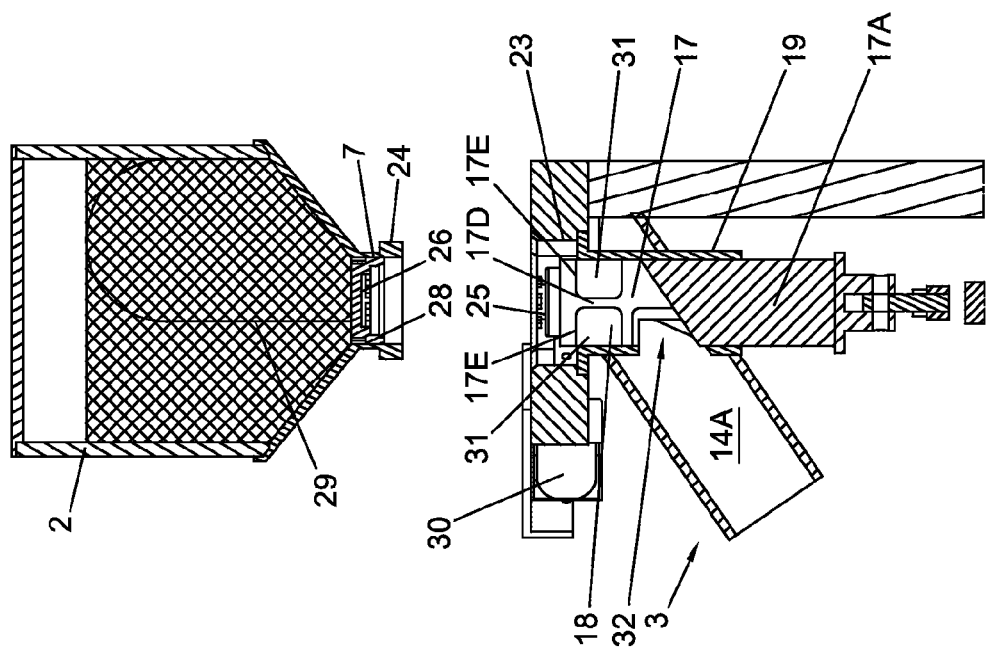
FIG. 6B
FIG. 6A

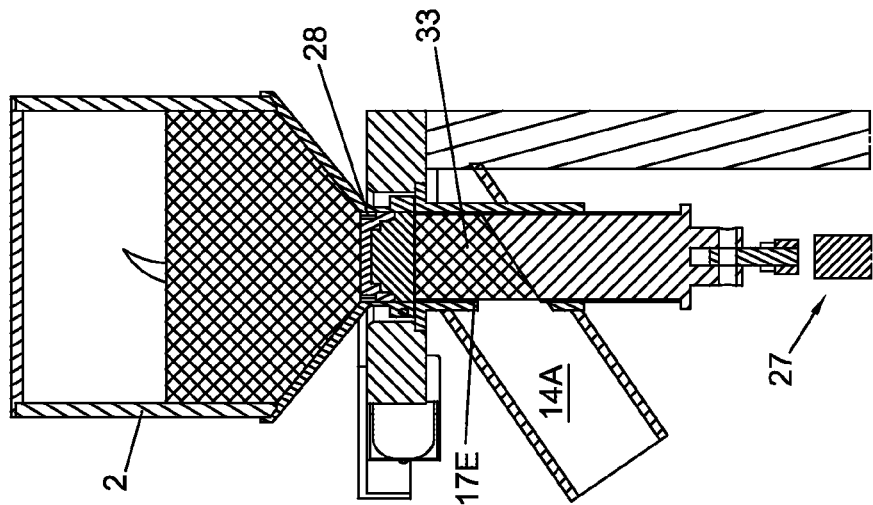
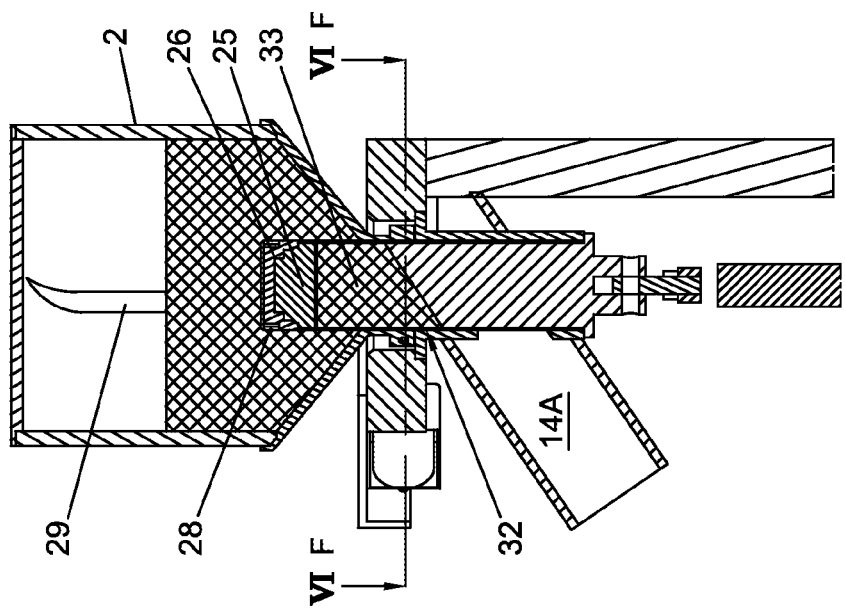

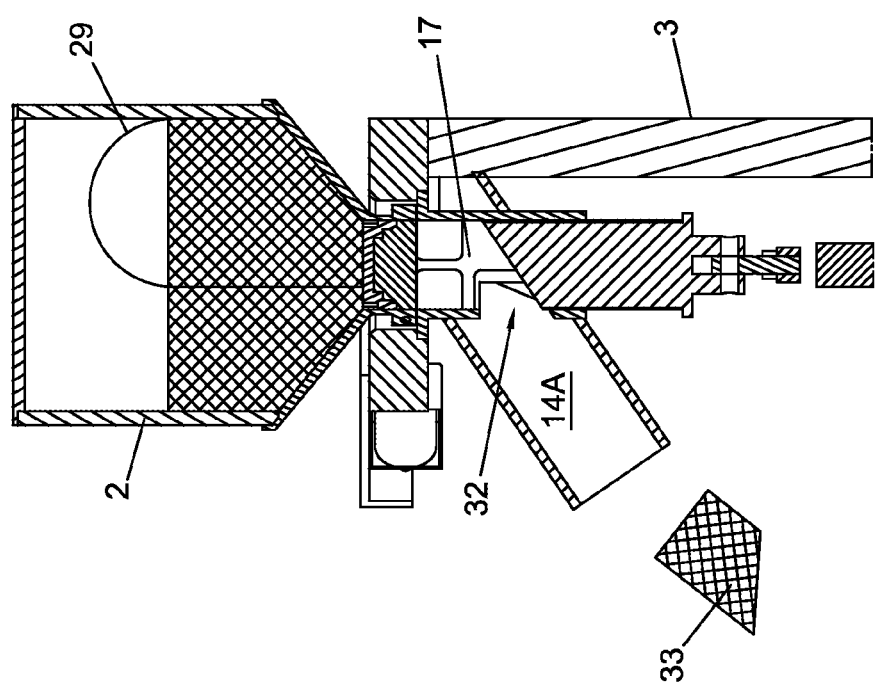

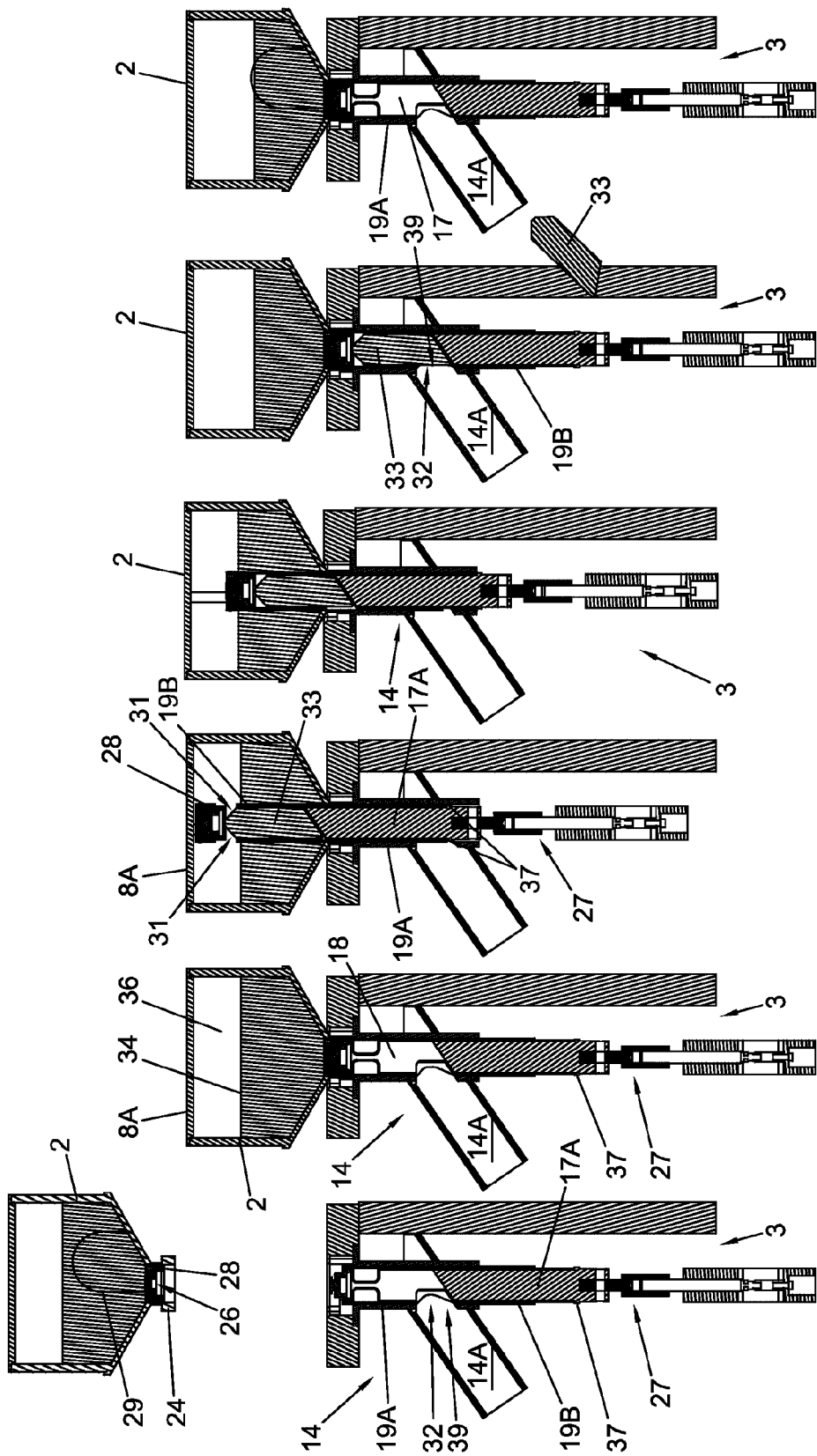

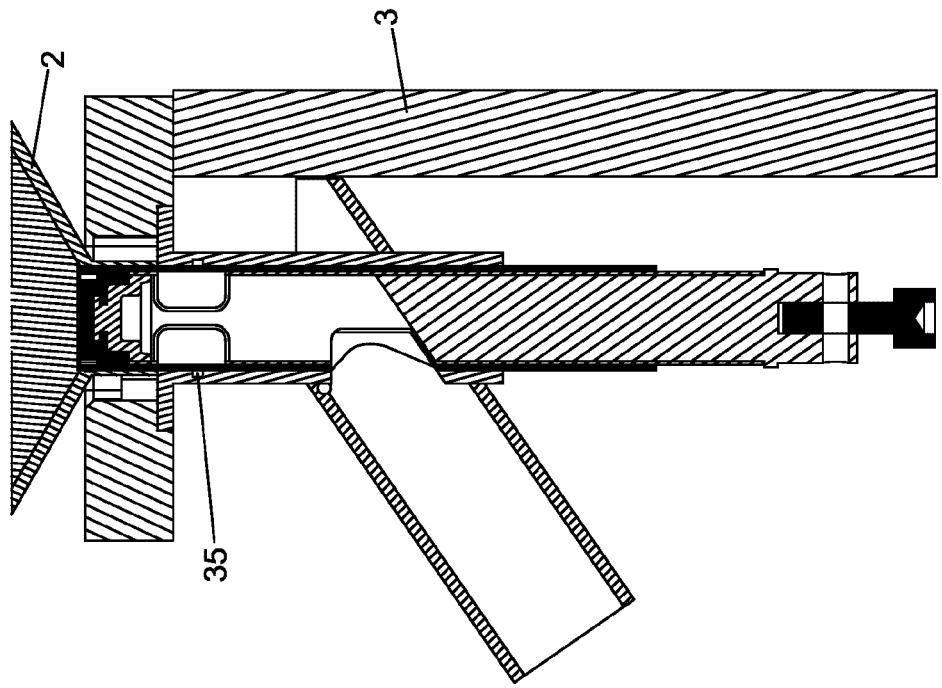
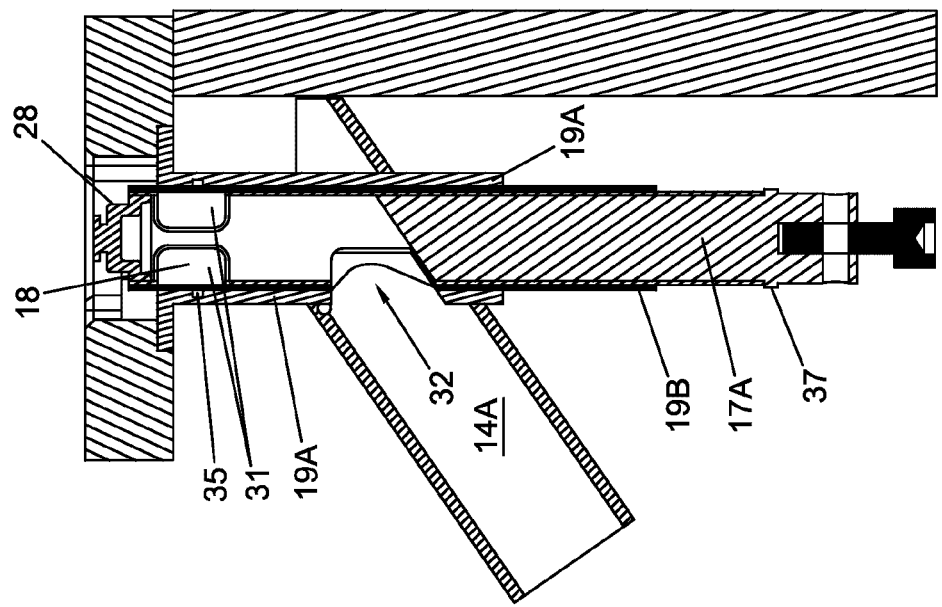
FIG. 8A
FIG. 8B

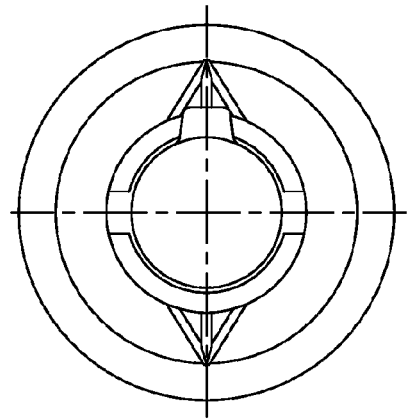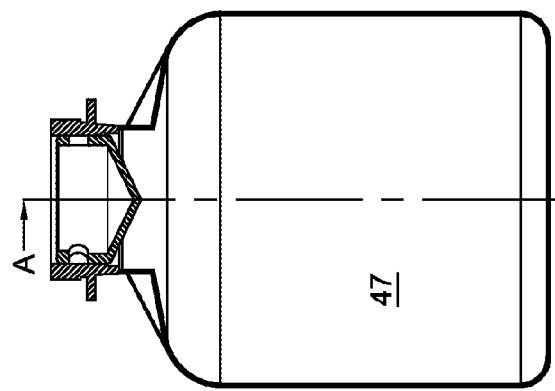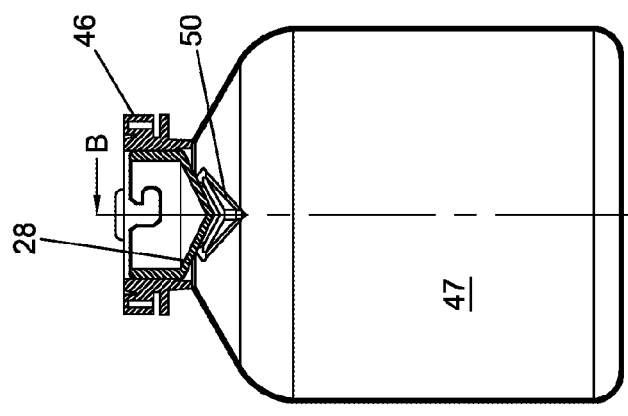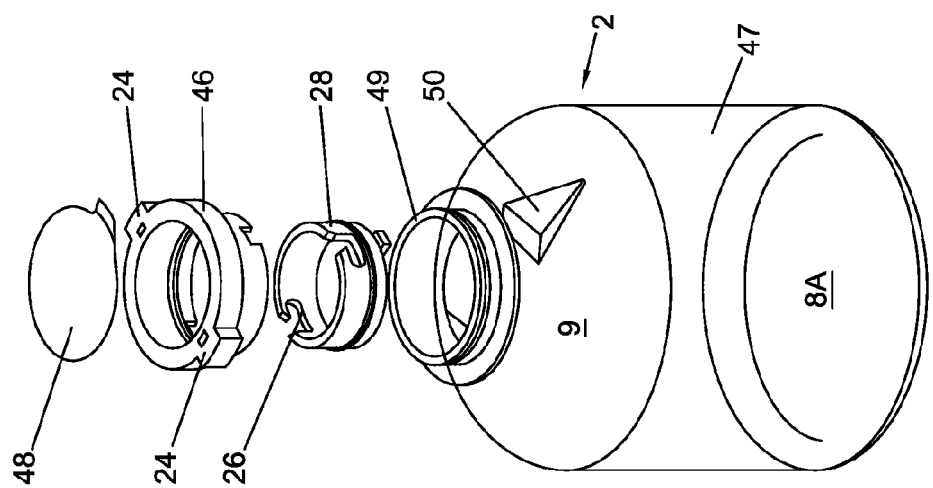

SYSTEM, PACKAGE, APPARATUS AND METHOD FOR DOSING COFFEE BEANS

CROSS-REFERENCE TO RELATED APPLICATIONS

The present application is a divisional of U.S. application Ser. No. 13/113,004, filed May 20, 2011, which is a continuation of International Application No. PCT/NL2009/050710, filed Nov. 23, 2009, which claimed priority to The Netherlands Application No. NL2002239, filed Nov. 21, 2008 and The Netherlands Application No. NL2002720 filed on Apr. 6, 2009. All of these applications are hereby incorporated herein by reference in their entireties.

The invention concerns a system for dosing coffee beans, comprising a coffee bean package provided with at least one wall which encloses an inner space for coffee beans, and a coffee bean outlet for delivering coffee beans.

The invention also concerns a coffee bean package, provided with sidewalls, a top wall and a bottom, which enclose an inner space, and an outlet, near the bottom.

The invention further concerns an apparatus, provided with a coffee bean grinder.

The invention furthermore concerns a method for dosing coffee beans.

Existing coffee makers are, for instance, filter coffee makers and espresso machines. In the case of filter coffee makers, an amount of ground coffee is placed in a filter, after which hot water is poured onto the ground coffee. Upon the water passing the ground coffee, the ground coffee is extracted and a coffee beverage is obtained, after which the coffee beverage, also referred to as filter coffee, flows through the filter while the coffee residues are left behind in the filter. It is customary for the hot water to flow through the ground coffee and the filter with the aid of gravity. After the hot water that corresponds with the amount of desired coffee beverage has been poured out over the ground coffee and has passed through the filter, the filter, at least if it is a disposable filter, can be thrown away with the ground coffee residue. Such a disposable filter typically consists substantially of paper. Also known are filters that are designed to be used more than once. After use, these filters are, for instance, cleaned, so that they can be filled with a next portion of ground coffee for preparing new coffee beverage with the same filter.

In coffee making by means of espresso machines, also a filter is provided for holding an amount of ground coffee. Here, under a relatively high pressure, hot water is forced through the ground coffee and the filter. The coffee beverage thereby obtained is generally relatively thicker than filter coffee and typically has a stronger concentration of coffee extracts than filter coffee, at least, given a comparable amount of ground coffee and supplied water. Typically, a metal filter is used.

Also, coffee beverage can be obtained in a known manner with the aid of a percolator. In certain machines, such as, for instance, the Senseo® coffee machine of the producers Douwe Egberts® and Philips®, for instance a paper disposable filter and a metal filter holder are used. Further, instant coffee is known, where coffee concentrate or freeze-dried coffee is dissolved in hot water. In this latter method, no filter at all is used.

If a relatively long time has elapsed between the grinding of the coffee beans and the preparation of the coffee beverage with the ground coffee, there is a chance that a part of the flavor and aromas given by coffee beans is lost. Without wishing to be bound to any theory, it may be that the larger total surface of the particles of the ground coffee together, compared with the joint surface of unground coffee beans of the same weight, causes relatively more exchange between the surface and the ambient air than the total surface of the coffee beans, which can adversely affect the taste and the odor of the coffee beverage. For that reason, in current machines with grinders, the coffee beans are ground a short time before the preparation of the coffee beverage.

Incidentally, it may also be that flavors and odors connected with the coffee beans may be lost or diminish when unground coffee beans come into contact with ambient air for a long time. Generally, for that reason coffee beans and ground coffee are packaged in airtight and/or vacuum packages.

Certain coffee machines may be provided with grinders that are integrated in the coffee machine. Also, such coffee makers may be provided with coffee bean holders for feeding the coffee beans directly from the coffee bean package. Through operation of the coffee making apparatus, a part of the coffee beans from the coffee bean holder is ground, for the purpose of preparing a coffee beverage with this ground coffee. For instance, the grinder is directly operated by pressing a button, whereby, for instance, the number of times the button is pressed, or the length of time of pressing the button, can determine the amount of ground coffee. In automatic coffee makers with grinders, the amount of coffee beverage and the strength of the coffee beverage can be pre-selected and/or pre-set, in which case on the basis of the selected strength a dose of beans is supplied from the holder to the grinder, so that an amount of coffee is obtained that, together with the predetermined amount of water, can result in a desired amount of coffee beverage of a desired strength.

Disadvantages of the above-mentioned principles can be that an amount of coffee beans is present in the coffee maker for a long time before it is ground, as a complete pack of coffee beans is emptied into the coffee bean holder. This can adversely affect the taste and odor of the coffee beverage prepared with these coffee beans.

Also, in and around the grinder of existing coffee makers there are typically residues left of the preceding grinding runs. Study has shown that in conventional grinders typically 3-10 grams of one or more preceding grinding runs are left behind in the grinder. These remainders of a previous grinding run may subsequently be entrained in a new grinding run, which can affect the taste of the coffee beverage. Moreover, if the coffee maker is filled with new coffee beans whose taste differs from the previous filling, the remainders of the previous filling may possibly be mixed with the ground coffee of the new coffee beans, so that not the desired taste inherent to the new coffee beans can be obtained. This may be disadvantageous in particular if the user regularly wishes to change the type of coffee beans. In conventional coffee makers, the user can circumvent this problem only by dosing the coffee bean holder in each case with a small amount of coffee beans. A disadvantage involved here, however, is that the coffee bean package then is not entirely emptied into the coffee maker and is left partly filled, so that the remaining coffee beans come into contact with ambient air. Typically, the coffee beans then are stored in the meantime in a separate, preferably airtight holder, such as an airtightly closable pot or tin. These holders, however, can take up relatively much space.

In the current state of the art, after grinding and making the coffee beverage, either ground coffee is left behind in the coffee maker or coffee beans are left behind in the coffee maker, or the coffee bean package is not emptied entirely and coffee beans remain behind in the package, or separate coffee bean holders are used. There is no system that allows regularly changing taste of freshly ground coffee in an efficient and convenient manner.

SUMMARY

An object of the invention is to obviate at least one of the above-mentioned disadvantages and/or other disadvantages.

In the following description, the coffee beans or ground coffee remaining preserved or package-fresh may be understood to mean that the taste, aromas and/or volatile components of the coffee beans or ground coffee remains relatively preserved. Package-fresh in this description may additionally be understood to mean the particular condition of coffee beans shortly after the package has been opened. This package has preferably been applied in a packaging process preferably right after roasting of the coffee beans. The package is preferably airtight and/or vacuumized so that the coffee beans can be preserved better. A particular 'kind' of coffee beans may be understood to mean that the kind in question pertains to a specific coffee bean-related taste, composition of aromas and volatile components of the coffee beans, or to a particular mix, composition or blend of coffee beans, preferably as stated on the package. If in this description different kinds of coffee beans are described, it may be understood that the related taste, aromas, mix, composition or blends are different. Unless stated otherwise, in this description coffee beans are understood to be roasted coffee beans. A predetermined dose in this description may be understood to mean, for instance, that the dose has been set beforehand, for instance by a configuration of a circuit or mechanical system of the coffee maker determined during manufacture, or that the dose has been set by the user right before coffee making.

In a first aspect, the invention provides a system for preparing coffee beverage to claim 1.

The system comprises a coffee bean receiving device for supplying coffee beans via a coffee bean inlet to a grinder, and a coffee bean package. The coffee bean receiving device may, for instance, be part of the coffee bean package or of a coffee making apparatus, or at least an apparatus that is provided with a coffee bean grinder. Before the coffee bean package is opened a first time for consumption, it is preferably closed off to prevent contact between the coffee beans and ambient air. The coffee bean outlet can then be closed off. For instance, the package is closed off airtightly and/or vacuumized, or oxygen absorbing materials are present in the package, capable of absorbing oxygen in the inner space. In yet another embodiment, for instance, a storage life enhancing gas is added to the inner space of the package. As a result, the coffee beans can remain relatively preserved until a first use.

The system can provide a partly movably arranged coffee bean receiving device for supplying coffee beans from the coffee bean package via an inlet to the grinder. The coffee bean receiving device can be guided through the coffee bean outlet into the inner space of the coffee bean package. The coffee bean receiving device may be provided with a dosing space for holding a predetermined dose of coffee beans. For instance, the inner volume of the dosing space may be approximately such that in substantially completely filled condition it contains approximately one dose of coffee beans. The dosing space can comprise, for instance, a chamber or trough, for holding a predetermined dose of coffee beans. The coffee bean receiving device is, for instance, provided with an opening for letting coffee beans from the coffee bean package into the dosing space. The coffee beans in the inner space can move into the dosing space, for instance, under the influence of gravity. After the dosing space has been filled, the dosing space can be guided back through the coffee bean outlet out of the inner space of the coffee bean package, so that the dose of coffee beans can be supplied to the grinder, for instance under the influence of gravity.

The coffee bean package can be connected directly to an apparatus with coffee bean grinder, such as, for instance, a coffee making apparatus, whereby the coffee bean package can be opened by the coffee bean receiving device so that the coffee beans can be passed directly from the package to the grinder. Here the package itself is connected to the apparatus so that package-fresh coffee beans can be ground and extracted. The coffee bean package then does not need to be, for instance, fed into a coffee bean holder permanently connected to a coffee making apparatus, where, after a grinding run, coffee beans are left in the holder. The coffee beans can be supplied directly from the package to the grinder, for instance through operation of the apparatus with grinder. After supplying the dose of coffee beans, the package can be uncoupled from the apparatus again. The system allows multiple coffee bean packages to be connectable to the apparatus, the coffee bean packages being, for instance, provided with a different printing and filled with different types of coffee beans.

The coffee bean package may be provided with a coupling part for coupling with an apparatus with grinder, so that the coffee bean package can be connected directly to the apparatus, and the coffee beans can be supplied to the grinder. The apparatus can be designed, for instance, with corresponding coupling parts.

In an embodiment, the coffee bean outlet and the coupling part of the package are provided near the bottom of the package, so that the package can be placed on the apparatus relatively simply. Further, the bottom may slope so that the coffee beans in the package can be guided towards the outlet, and in coupled condition towards the dosing space, under the influence of gravity. In a further embodiment, a guide part is provided near the outlet, so that the outlet can be positioned relatively accurately.

In yet another embodiment, the coffee bean package is provided with closing means to close off the coffee bean outlet. The package can be closed off by the closing means when the coffee bean package is uncoupled from the apparatus, so that the coffee beans in the package remain relatively preserved, also between different grinding runs of coffee beans from the same coffee bean package. The closing means can also close off the package between two actions for delivering coffee beans from the same package, without the package needing to be uncoupled. In this way, the beans remain better preserved also during coupling with the apparatus.

In another embodiment, closing off of the coffee bean outlet may be effected, for example, by closing means that are provided in the apparatus, the package having, for instance, a closure that can be opened only a single time.

Preferably, the closing means comprise a kind of cap which can close off the outlet of the package. The closing means may be provided with a second coupling part for coupling with the coffee bean receiving device. The coffee bean receiving device may be provided with a corresponding coupling part. Upon connection of the package with the apparatus, the first coupling part of the package is coupled with a corresponding coupling part of the apparatus, and the second coupling part of the closing means with the coffee bean receiving device. During use, the first coupling parts can, in principle, remain in place, while the second coupling parts will move along with the coffee bean receiving device and the closing means. The closing means are preferably opened inwards, that is, into the inner space of the package, so that the dosing device with the closing means can move inwards to receive beans. Upon moving of the dosing device out of the package, the closing means can be placed against the outlet again. To prevent the possibility of the closing means in uncoupled condition being removed from the package, the closing means may be provided with a safety stop. Due to the stop, the closing means cannot, or with difficulty, be taken from the package. The stop can comprise a projecting cam, so that the outlet is too narrow for the closing means to be moved through it.

The closing means can close off the package so that exposure of the coffee beans in the coffee bean package to ambient air is prevented. This may be understood to mean, inter alia, a closure that passes at least substantially no air from the environment to the beans in the package and vice versa. Preferably, the closing means can pass at least substantially no air from the environment to the beans in the package and vice versa when there is a pressure difference between the space in the package in which the beans are present and the environment that is at most 1.1, preferably 1.2, more preferably 1.3 and still more preferably 1.5. bar.

In a further embodiment, the closing means clear the coffee bean outlet when the coffee bean receiving device moves through the coffee bean outlet. For instance, the coffee bean receiving device pushes the closing means open in the direction of the inner space of the coffee bean package. In another embodiment, the closing means are controlled to open in a different manner.

In yet another embodiment, the coffee bean receiving device comprises a shaft within which the dosing space can move, with the shaft forming the outer boundary of the dosing space when the dosing space extends within the shaft. The shaft can connect to the coffee bean outlet so that the dosing space can be guided from the shaft through the coffee bean outlet, and after loading of the dosing space can be guided back again. In an embodiment, the dosing space moves in the package, thereby taking up a dose of coffee beans, to above the level of the beans in the inner space. Thereupon the shaft can be placed upwards around the dosing space, so that the dosing space is closed off. The dosing space and shaft can then be moved down, out of the package, and outside the package the beans can be delivered to the grinder. Such a construction obviates the necessity of beans needing to be cut or broken when separating the coffee beans in the dosing space from the coffee beans in the inner space.

Preferably, a single drive is used for driving the shaft and the dosing space. To be able to move the dosing space relative to the shaft, the system is provided with a stop which can engage the shaft and/or the dosing space. In an embodiment, the drive drives the shaft, while the shaft engages the dosing space through friction, so that the dosing space is carried along through friction. In an initial position, the dosing space projects above the shaft, so that the dosing space is moved into the package first. The dosing space and the shaft can be moved upwards until the dosing space strikes against the top wall of the package, whereby the dosing space has been filled with the beans that have been loaded into the dosing space during the upward movement. While the dosing space is stopped by the top wall, the shaft can then move, against the force of the friction, around the dosing space. In this embodiment, the distance between the outlet and the top wall is such that the top wall can serve as stop for the dosing space.

In another embodiment, for instance, the dosing space is driven and the shaft is carried along through friction. The apparatus or the outlet is then, for instance, provided with a stop that engages the shaft, whereby the shaft is stopped while the dosing space moves out of the shaft.

In an embodiment, the coffee bean outlet can form the outer boundary of the dosing space when the dosing space extends within the coffee bean outlet. The coffee bean outlet can have relatively stiff edges and/or walls for guiding the coffee bean receiving device, in particular the first shaft.

The dosing space may be arranged to be filled with one predetermined dose of coffee beans. Such a dose can comprise, for instance, between five and ten grams of coffee beans, and, for instance, depend on the chosen strength of the portion of coffee. The inner space of the coffee bean package may be arranged to be filled with multiple such doses, for multiple portions of coffee. Before use, the coffee bean package may be filled, for instance, with at least about 20 grams, in particular at least about 50 grams, more particularly at least about 70 grams, still more particularly at least about 150 grams of coffee beans. The coffee bean package can deliver coffee beans multiple times, for multiple portions of coffee. When the package is empty, it can be thrown away. In another embodiment, the package can be refilled again after it has been emptied.

In an embodiment, the volume of the dosing space can be settable, for instance, to allow setting of the strength and amount of one portion of coffee.

The apparatus may be provided with a second coupling part which in coupled condition can engage the coupling part of the coffee bean package. In an embodiment, the circumferential walls and/or bottom of the coffee bean package are stiff. This can allow the package to be relatively simply connected to the apparatus and taken from it again multiple times. Preferably, the package and the attachment part can be coupled and uncoupled by hand.

In an embodiment, the coffee bean receiving device is a part of the apparatus. For instance, the package is connected to the apparatus, through the corresponding coupling parts. Thereupon, the receiving device can move through the outlet whereby the closing means are opened, and be retracted again. In another embodiment, the coffee bean receiving device in uncoupled condition is part of the coffee bean package. In coupled condition, the receiving device is, for instance, moved partly into and out of the package with the aid of a movement device that is provided in the apparatus.

In yet another embodiment, the supplied dose of coffee beans from the dosing space is wholly ground by the grinder, so that no coffee beans are left upstream of the grinder anymore. In this way, in each grinding run, only package-fresh coffee beans can be ground, and, for instance, be supplied directly to a coffee preparation device, for preparing coffee beverage upon supply of water to the ground coffee.

In a second aspect, the invention provides a coffee bean package.

The coffee bean package is arranged for coupling with and uncoupling from an apparatus with a grinder, preferably a coffee making apparatus. For the purpose of coupling and uncoupling, the package is provided with a coupling part. The package is additionally provided with an outlet, near the bottom. Also, the package has reclosable closing means which prevent coffee beans from falling out of the package, in particular in an uncoupled condition of the package, and preferably also in a coupled condition of the package. For instance, the closing means open only when coffee beans are delivered to the grinder.

The closing means may be provided with a second coupling part which can be engaged by the apparatus for opening the closing means. The closing means can preferably be opened only inwards, into the inner space of the package. Preferably, the package is so arranged as to prevent the possibility of the closing means being taken out of the package.

The bottom is provided with at least one tapering wall part so that in a condition when coupled with an upstanding apparatus, coffee beans flow towards the coffee bean outlet automatically under the influence of gravity. This makes it possible to allow the package to be emptied in steps, for instance with the aid of opening and closing the closing means and/or with the aid of a coffee bean receiving device cooperating with the outlet as already discussed above.

The closing means are preferably provided with a sloping top side so that the coffee beans on the top side slide down along the closing means. When the package is filled with coffee beans, even before putting the package into use for the first time, preferably an empty headspace is provided in the package so that the dosing space can come above the level of the coffee beans.

In a third aspect, the invention provides an apparatus.

The apparatus may be provided with a partly movably arranged coffee bean receiving device for supplying coffee beans from a coffee bean package to the grinder, preferably via a coffee bean inlet. The coffee bean receiving device may be provided with a dosing space for holding a predetermined dose of coffee beans. In particular, the coffee bean receiving device is arranged to be guided in coupled condition through the coffee bean outlet of the coffee bean package into the inner space of the coffee bean package. As a result, the coffee bean receiving device can let coffee beans from the coffee bean package into the dosing space. When the dosing space is filled, the coffee bean receiving device can be guided back out of the inner space for supplying the dose of coffee beans from the dosing space to the grinder. Furthermore, the apparatus is provided with a coupling part for coupling with and uncoupling from a corresponding coupling part of a coffee bean package. The apparatus preferably comprises a coffee making apparatus. The coffee making apparatus can in principle comprise any apparatus for preparing coffee. The coffee making apparatus can comprise, for instance, a filter coffee making apparatus, or a coffee making apparatus that is arranged to supply water under elevated pressure to ground coffee. Elevated pressure may be understood to mean a pressure that is more than one atmosphere. The coffee making apparatus can be, for instance, an espresso machine, or, for instance, a coffee making apparatus working with a pressure of about 1-3 bar.

In a fourth aspect, the invention provides a method for preparing coffee beverage according to claim 33.

The method comprises coupling a coffee bean package with an apparatus that is provided with a coffee bean grinder, and guiding the coffee bean receiving device into the inner space of the coffee bean package so that a dose of coffee beans is passed into the coffee bean receiving device, for instance through an opening in the coffee bean receiving device. The at least partly filled coffee bean receiving device thereupon moves through the coffee bean outlet back out of the inner space of the coffee bean package, whereupon the coffee beans outside the coffee bean package can be fed to the grinder. In an embodiment, the coffee beans in the coffee bean receiving device, upon retraction from the coffee bean package, are supplied to the grinder under the influence of gravity. Preferably, all coffee beans supplied from the coffee bean receiving device are ground by the grinder, so that upstream of the grinder no coffee beans are present anymore. After supplying of the coffee beans to the grinder, the coffee bean package can be taken off the apparatus again.

In an embodiment, the coffee bean package, after uncoupling from the apparatus, closes itself off, so that residual coffee beans that are still in the coffee bean package remain in the package. In coupled condition, the coffee bean outlet can be cleared for allowing the coffee bean receiving device to pass, so that the receiving device can be filled. In a further embodiment, the closing means are pushed open inwards by the coffee bean receiving device for delivering coffee beans from the package, and thereupon placed back on the outlet again for closing off the package.

In an embodiment, the coffee bean receiving device comprises a shaft and a dosing space. For filing the dosing space with coffee beans, the dosing space is moved into the package while pushing the closing means open. While coffee beans flow into the dosing space, the dosing space moves up until the dosing space projects at least partly above the level of the coffee beans. After this, the shaft is moved around the dosing space for closing off the dosing space. Thereupon the shaft and the dosing space can move out of the package together, the dosing space having been filled with the predetermined dose of coffee beans. The dosing space can then halt adjacent the coffee bean inlet to the grinder. The shaft can then move further relative to the dosing space so that the opening to the dosing space is cleared and the coffee beans can flow out of the dosing space, into the inlet.

To move the shaft and the dosing space together, for instance the shaft may be driven, with the shaft carrying along the dosing space through friction. To move the shaft relative to the dosing space in a position where the dosing space projects at least partly above the coffee beans, the dosing space may be stopped against the top surface of the package while the shaft can be moved along the dosing space.

Further embodiments, effects and features of the present invention will appear from the following description, in which the invention is described in more detail in multiple exemplary embodiments with reference to the appended drawings, in which:

BRIEF DESCRIPTION OF THE DRAWINGS

FIGS. 2A-D show in a schematic manner cross sections in front view of a system for dosing coffee beans in different steps;

FIGS. 3A-G show in a schematic manner cross sections in front view of a system for dosing coffee beans in different steps;

FIGS. 5A-E show in front view different positions of the package and the coffee bean receiving device;

FIGS. 6A-E show in front view detailed representations of FIGS. 5A-E, respectively;

FIGS. 7A-F show in front view different positions of another embodiment of the package and the coffee bean receiving device;

FIGS. 8A-D show in front view detailed representations of FIGS. 7A-D, respectively;

FIG. 10A shows an exploded perspective view of a coffee bean package;

FIGS. 10B-D respectively show a front, side and top plan view of the assembled package according to FIG. 10A.

DETAILED DESCRIPTION OF VARIOUS EMBODIMENTS

Figure 1:
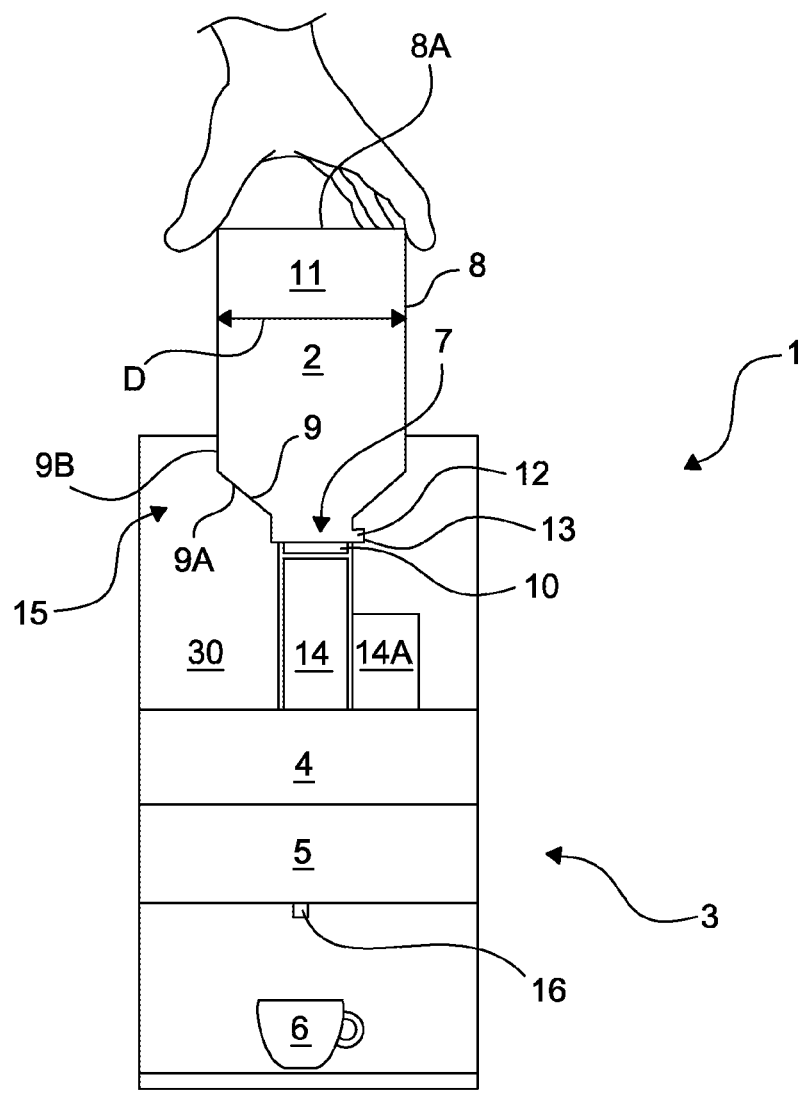
FIG. 1 shows in side elevation a schematic diagram of a cross section of a system for preparing coffee beverage.

In this description the same or corresponding parts have the same or corresponding reference numerals. In the drawing, embodiments are shown only by way of example. The elements used in them are mentioned only as examples and should not be construed as limiting the invention. Also other elements may be used within the framework of the present invention. The proportions of the embodiments shown in the figures are typically represented schematically and/or exaggeratedly and should not be construed as limiting. In this description, in particular, reference is made to a package for coffee beans. However, this description does not relate to just whole coffee beans. Coffee beans are to be understood to cover also fragmented coffee beans, that is, coffee bean fragments, which coffee bean fragments are still to be ground for extracting desired coffee beverage. The coffee beans are for instance broken, before they are packaged. In an embodiment, at least a part of the coffee beans in the coffee bean package are divided into about thirty or less, in particular about fifteen or less, more particularly about ten fragments or less. One coffee bean fragment then comprises, for instance, one-thirtieth part, in particular one-fifteenth part, more particularly one-tenth part or more of a coffee bean. For instance, the coffee bean fragments comprise a half or a quarter of a coffee bean. An advantage of the use of coffee bean fragments compared with whole coffee beans can be that coffee bean fragments can be supplied to the grinder relatively simply and/or that the package can be closed off relatively simply. This is because the coffee bean fragments are relatively small and hence can slide relatively easily through openings in the package and the apparatus and/or will block the coffee bean outlet and/or closing means less easily. As the coffee beans may beforehand have been divided into fragments, though not ground, in the meantime comparatively more bean surface can come into contact with any ambient air than would be the case with whole coffee beans. On the other hand, less bean surface will come into contact with air than would be the case with ground coffee, so that coffee bean fragments can be preserved relatively better than ground coffee beans. Only just before preparation of the coffee beverage are the coffee bean fragments ground for obtaining coffee beverage. In this description, therefore, coffee bean may also be understood to include a fragmented coffee bean, which, though, is still to be ground for preparing the desired coffee beverage.

In FIG. 1 there is shown a system 1 for dosing coffee beans. In the embodiment shown, the system 1 comprises a coffee bean package 2 which is coupled with an apparatus 3. The apparatus 3 is provided with a grinder 4. In the embodiment shown, the apparatus 3 comprises a coffee making apparatus. To that end, the apparatus 3 is provided with a coffee preparation device 5 for supplying coffee to a holder, such as a coffee cup 6. Preferably, the system 1 is arranged for preparing coffee beverage.

The package 2 comprises a top wall 8A, a circumferential wall 8 and a bottom 9, as well as a coffee bean outlet 7, which in closed condition is closed off by a closing means 10, such as, for instance, a plug or cap or the like. Preferably, the coffee bean outlet 7 is so large that multiple coffee beans can flow through the outlet simultaneously, side by side. The walls 8, 8A, bottom 9 and closing means 10 enclose an inner space 11. The inner space 11, at least prior to use, is filled with coffee beans. The apparatus 3 is provided with a coffee bean receiving device 14 for supplying coffee beans from the package 2 to the grinder 4, for instance, via a coffee bean inlet and/or a coffee bean transport path 14A. Instead of, or in addition to, the closing means 10, the coffee bean receiving device 14 can close off the outlet 7.

The package 2 and the apparatus 3 comprise coupling parts 12, 13, respectively, for coupling the package 2 to the apparatus 3, preferably such that the outlet 7 can connect to the coffee bean receiving device 14. The system can be provided with a connecting device 15, of which the coupling parts 12, 13 can be a part. The apparatus 3 can be arranged for wholly or partly receiving the coffee bean package 2, for instance, so that the package 2 is partly received and/or enclosed and/or fixed. In an embodiment, the coffee bean package 2 is provided, for instance, with relatively stiff guide parts 9A, 9B, which are respectively formed by the bottom 9, and a part of the circumferential wall 8. The guide parts 9A, 9B can serve as a guide, for connecting the coffee bean package 2 to the coffee making apparatus 3.

The circumferential wall 8 and bottom 9 can comprise, for instance, stiff walls. The bottom 9 can comprise, for instance, a conically shaped wall, with the coffee bean outlet 7 in the center. The guide parts 9A, 9B are configured such that the coffee bean outlet 7 upon coupling can connect to the coffee bean receiving device 14. For fixing the package 2 on the apparatus 3, coupling parts 12, 13 comprise, for instance, thread, a click connection, a bayonet closure or other connecting possibility.

The package 2 is preferably so dimensioned that it can be coupled with and/or uncoupled from the apparatus 3 with one hand (see FIG. 1), for instance, to be able to grasp the apparatus 3 with the other hand during coupling of the package 2, and/or to be able to turn the package relatively easily into the apparatus, for instance if the coupling parts 12, 13 comprise a rotary coupling such as, for instance, a screw or bayonet connection. The diameter D of the circumferential wall 8 can be, for instance, less than 200 millimeters, in particular less than 130 millimeters.

Preferably, the coffee bean package 2, at least before it is placed on the coffee making apparatus 3, is closed in itself, with the aid of a closing means 10, such that exposure of the coffee beans to ambient air is prevented. Preferably, to that end, the package 2 is closed off airtightly and/or vacuumized. The coffee bean package 2 may be a disposable package and/or may be manufactured, for instance, substantially from paper and/or foil and/or cellulose and/or plastic and/or tin, while the package 2, after being emptied, can be thrown away. The closing means 10 may be provided, for instance, with a closing ring, for instance of an elastomeric or plastic material.

The coffee preparation device 5 is arranged for the preparation, with supply of water to the ground coffee, of coffee beverage. A coffee outlet 16 is provided for dispensing the coffee beverage. The coffee preparation device 5 may be arranged, for instance, to supply hot water under pressure, for instance, under a pressure of 4-15 bar, as with an espresso machine, and/or arranged as a pour-on system, as with a filter coffee making apparatus. Also, the coffee making apparatus may be arranged to prepare the coffee beverage under a slightly elevated pressure of the order of 1.1-2, in particular 1.1-1.5 bar. A water supply 30 may be provided for the provision of water, preferably hot water for the preparation of coffee beverage. For heating the water, at least a heat element may be provided.

Figure 2D:
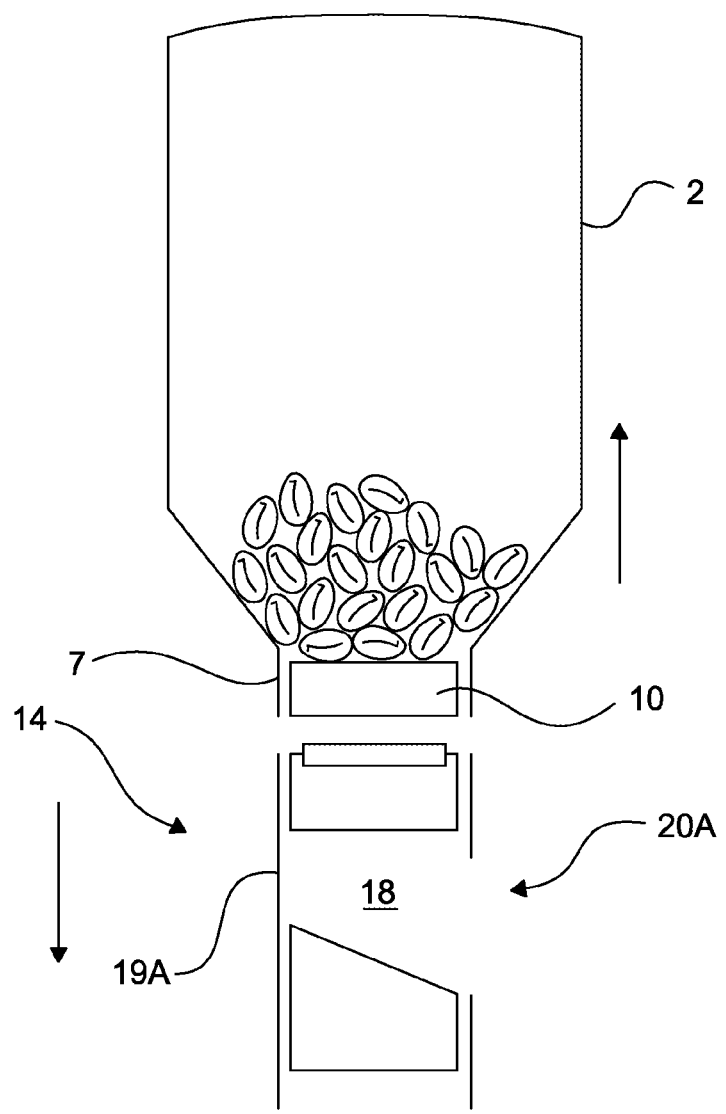

The system 1 is arranged to enable predetermined doses of coffee beans to be supplied to the grinder 4, for instance, as shown in FIGS. 2A-D. As can be seen in FIG. 2A, the package 2 may be connected to the apparatus 3 such that the outlet 7 connects with the receiving device 14. The receiving device 14 can comprise a dosing space 18 and at least one dosing space wall 17, while the dosing space wall 17 may be arranged to engage the closing means 10. The dosing space wall 17 can comprise, for instance, a dosing space bottom 17A and a dosing space top 17B, between which the dosing space 18 can be present. The dosing space wall 17 may be arranged as a kind of piston, which may be guided through the receiving device 14 and/or through the outlet 7. The closing means 10 and the dosing space wall 17 can comprise coupling elements 21, which may allow, for instance, upon coupling of the package 2 onto the apparatus 3, the closing means 10 and the dosing space wall 17 to be fixed with respect to each other. The coupling elements 21 comprise, for example, thread, a click connection, a bayonet closure or another connection possibility for securing the dosing space wall 17 and the closing means 10 with respect to each other. The coupling elements 21 may be provided additionally or instead of the earlier-mentioned coupling parts 12, 13.

The receiving device 14 may be provided with a shaft 19, which can guide the dosing space wall 17 in the direction of the package 2 and/or away therefrom. The lower boundary 17A and upper boundary 17B may be connected with each other through at least one stiff spacer 17D, the spacer 17D comprising, for instance, a rod, screw or the like. The spacer 17D may be arranged, for instance, to allow the distance between the lower boundary 17A and the upper boundary 17B to be adjusted. For instance, the spacer 17D, or at least a part thereof, is screwable, extendable, telescopable, or the like. Also, the dosing space wall 17 could be provided with a lower boundary 17A and at least one spacer 17D that may be arranged to engage, and/or to be coupled with, the closing means 10, allowing the dosing space 18 to be formed by the lower boundary 17A and the closing means 10, and whereby during coupling of package 2 and apparatus 3 the spacer is coupled with the closing means 10. The spacers may be arranged such that supply of coffee beans from the inner space 11 of the package 2 into the dosing space 18 is not, or little, hindered. Also, the wall of the shaft 19 and/or the spacers can bound the dosing space 18.

As can be seen, the bottom 9 of the package 2 slopes slightly, so that the coffee beans slide towards the outlet 7 and/or receiving device 14 under the influence of gravity. As shown, the closing means 10 can prevent the coffee beans from coming down further. Also, the bottom 9, due to the sloping or conical shape, can function as a guide 9A in the coupling of the package 2 with the apparatus 3, as already described above.

If a user wants coffee beverage, he can put the system 1 into operation, for instance, by activating the apparatus 3 through an operating element. Activation of the apparatus 3 can set the dosing space 18 of the receiving device 14 into motion, for instance, through a movement device (not shown). The movement device can comprise, for instance, a pneumatic or hydraulic actuator, rotary or linear motor, and/or, for example, a worm wheel drive. The movement device may also be driven manually. The movement device may be arranged to cause the dosing space wall 17 to rotate, for example for effecting a coupling with the closing means 10. As can be seen in FIG. 2 B, the dosing space 18 moves in the direction of the inner space 11. In an embodiment, it is also possible that the package 2 with inner space 11 moves in the direction of the dosing space 18.

Upon the movement of the dosing space 18 and the inner space 11 towards each other, the closing means 10 can be pushed into the inner space 11 by the dosing space wall 17 and/or the spacers. As a result, the dosing space 18 can reach a level at the location of the coffee beans. Under the influence of gravity, the coffee beans, at least a part of the coffee beans, slide into the dosing space 18, whereby the dosing space 18 can be filled. Depending on the filling of the package 2, the dosing space 18 can be wholly or partly filled. Preferably, the dosing space 18 is filled completely with each filling run. For instance, it may happen that after a number of portions of coffee beverage have been served with one package, there are still some coffee beans left in the package but not sufficient for one portion of coffee. In such a case, this may be sensed by the system 1 through a sensor, for example a weight sensor, an optical sensor, or the like, so that the user is warned of the incomplete filling. The system 1 can then be arranged to temporarily store the incomplete dose of coffee beans in the dosing space 18, until a new, filled package 2 is coupled with the apparatus 3, so that the dosing space 18 can be filled further. In yet another embodiment, the system 1 is arranged to warn the user if there is less than one dose of coffee beans present in the package 2.

After filling of the dosing space 18 with coffee beans, the dose of coffee beans can be supplied from the dosing space 18 to the grinder 4 (FIG. 2C). For this, the dosing space 18 moves with respect to the inner space 11 in a direction away from the inner space 11, in the direction of the receiving device 14, in particular the shaft 19. During this movement, the dosing space 18 may at least partly be closed off all around by the outlet 7 and/or by the receiving device 14, in particular the shaft 19. Preferably, the system 1 is arranged so that coffee beans present between the closing means 10 and the bottom 9 of the package 2 can be cut off. To this end, the closing means 10 and/or the upper boundary 17B may be provided, for example, with a strong edge, and/or the dosing space wall 17 may be driven with high power and/or speed by the movement device. Thus, possible blocking of the system 1 by coffee beans may be prevented.

The receiving device 14 may be provided with a supply opening for supply of the dose of coffee beans from the dosing space 18 to the grinder 4, for example via a coffee bean transport path 14A. The dosing space 18 is emptied, for instance, when it is approximately adjacent the supply opening 20. The supply opening 20 may be provided in the shaft 19. The dosing space 18 may be so arranged that the coffee beans flow out of the dosing space 18 under the influence of gravity when the dosing space 18 is adjacent the supply opening 20. For instance, the dosing space wall 17 is provided with a slanting bottom 17B, so that the coffee beans move out of the dosing space 18 under the influence of gravity, at least when the dosing space 18 is cleared, for instance through the supply opening 20.

As can be seen in FIG. 2D, when removing the package 2 from the apparatus 3, the closing means 10 can close off the outlet 7. Preferably, the dosing space wall 17 and the closing means 10 uncouple prior to or during removal of the package 2. The coupling elements 21 are arranged, for instance, to uncouple when the coupling parts 12, 13 are uncoupled. For instance, the coupling elements 21 and the coupling parts 12, 13 are arranged to be coupled and uncoupled through an equal rotary movement. In another embodiment, the closing means 10 is arranged, for instance, with spring elements capable of exerting a continuous spring force on the closing means 10 in the direction of the outlet 7. The spring elements are, for instance, coupled with one of the walls 8, 8A, 9 or the outlet 7 of the package 2. By the spring elements, the closing means 10 can be pushed in the direction of the outlet 7 to close off the outlet 7. For delivering coffee beans from the inner space 11 to the dosing space 18, the dosing space wall 17 pushes the closing means 10 into the inner space 11, against the spring force. Upon opening of the outlet 7, the closing means 10 may move, for instance, in a substantially straight line in the direction of the top wall 8A, or hinge open in the direction of the circumferential wall 8.

In an embodiment not shown, prior to use the outlet 7 is closed off, for instance, by a breakable closing means. At first use, the dosing space wall 17, for example, pushes open the closing means, whereby the dosing space wall 17, when the package 2 and the apparatus 3 are coupled, closes off the outlet 7. In this embodiment, it may, for instance, not be desirable for the package 2 to be taken off the apparatus 3 before it is empty and/or a cap may be placed on the outlet 7 before taking a partly filled package 2 off, still.

Figure 3G:
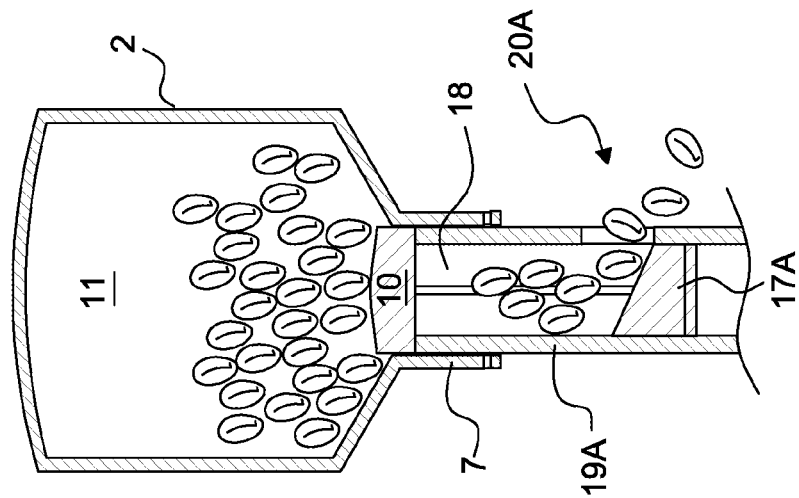
Figure 3F:
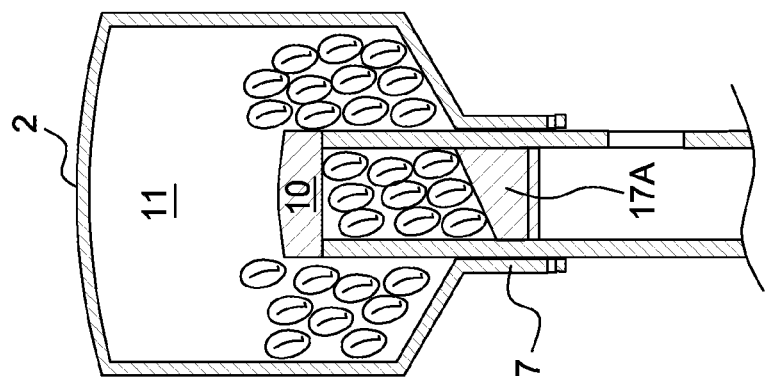
Figure 3E:
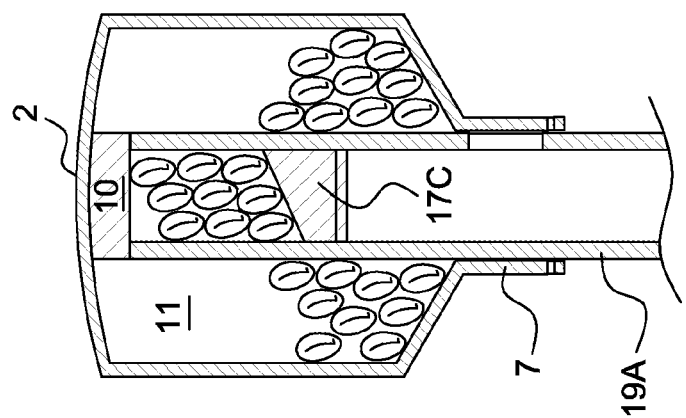

In FIGS. 3A-G there is shown another embodiment. As can be seen in FIG. 3A, the receiving device 14, after placement of the package 2 onto the apparatus 3, approximately connects with the outlet 7 and/or the closing means 10. The receiving device 14 can comprise a movable shaft 19A and a dosing space wall 17. The dosing space wall 17 comprises, for instance, a lower boundary 17A. The dosing space wall 17 can function as a piston, within the movable shaft 19A, and to that end may be driven, for instance, by a movement device. The lower boundary 17A may be connected with at least one spacer 17D which is capable of keeping the closing means 10 spaced from the lower boundary 17A, for forming the dosing space 18 between the lower boundary 17A and the closing means 10. As can be seen in FIG. 3B, the closing means 10 can be pushed towards the inner space 11 by the movable shaft 19A and/or the spacer 17D. The shaft 19A can then move along, for example, approximately as far as the upper inner edge 7A of the neck of the outlet 7. The lower boundary 17A and the closing means 10 then move further into the inner space 11, so that the dosing space 18 can move outside of the shaft 19A and/or neck of the outlet 7, allowing the coffee beans to flow into the dosing space 18 (FIG. 3C), under the influence of gravity. Here, the closing means 10 is, for instance, pushed forward, and kept at a distance from the lower boundary 17A, by the spacer 17D. When the dosing space 18 is filled, the shaft 19A can move, for instance, towards the closing means 10, or at least the top of the dosing space 18, to enclose the dosing space 18 (FIG. 3D). The shaft 19A can then be guided by the outlet 7. The shaft 19A preferably connects with the closing means 10, or at least the top of the dosing space 18, so that the dose of coffee beans in the dosing space 18 is separated from the rest of the coffee beans in the inner space 11 (FIG. 3E). The coffee beans that may be caught between the shaft 19A and the closing means 10 are, for instance, pushed away, crushed or cut off or the like by the shaft 19A, or fall off the edge of the shaft 19A, under the influence of gravity, before the shaft and the closing means 10 connect to each other. The receiving device 14 can thereupon move back out of the package 2 (FIG. 3F). When the upper edge of the shaft 19A and/or the closing means 10 are approximately adjacent the outlet 7, the shaft 19A can halt while the lower boundary 17A moves further, in the direction of the supply opening 20A, so that the dose of coffee beans from the dosing space 18 can be guided through the supply opening 20A in the direction of the grinder 4, for instance under the influence of gravity. The closing means 10 has meanwhile been carried along as far as the outlet 7 and closes off the outlet 7 again, so that, in principle, the package 2 can be taken off the receiving device 14. again.

In the above description, it has been described that the coffee beans move into and/or out of the dosing space 18 under the influence of gravity. In further embodiments, the coffee beans can move under the influence of, for example, vibrations, motions and/or relative angular displacements that are brought about in the apparatus 3.

In an embodiment, the package is refillable. For instance, the package 2 may be filled with coffee beans separately from the apparatus 3, for instance through the outlet 7, for instance by opening the closing means 10 manually. In another embodiment, by contrast, the package 2 is secured against refilling, or at least secured against manual opening of the closing means 10. For instance, the closing means 10 is arranged to be opened by the connecting coupling elements 21 of the receiving device 14, whereby operation of the coupling elements 21 by fingers is prevented.

Figure 4:
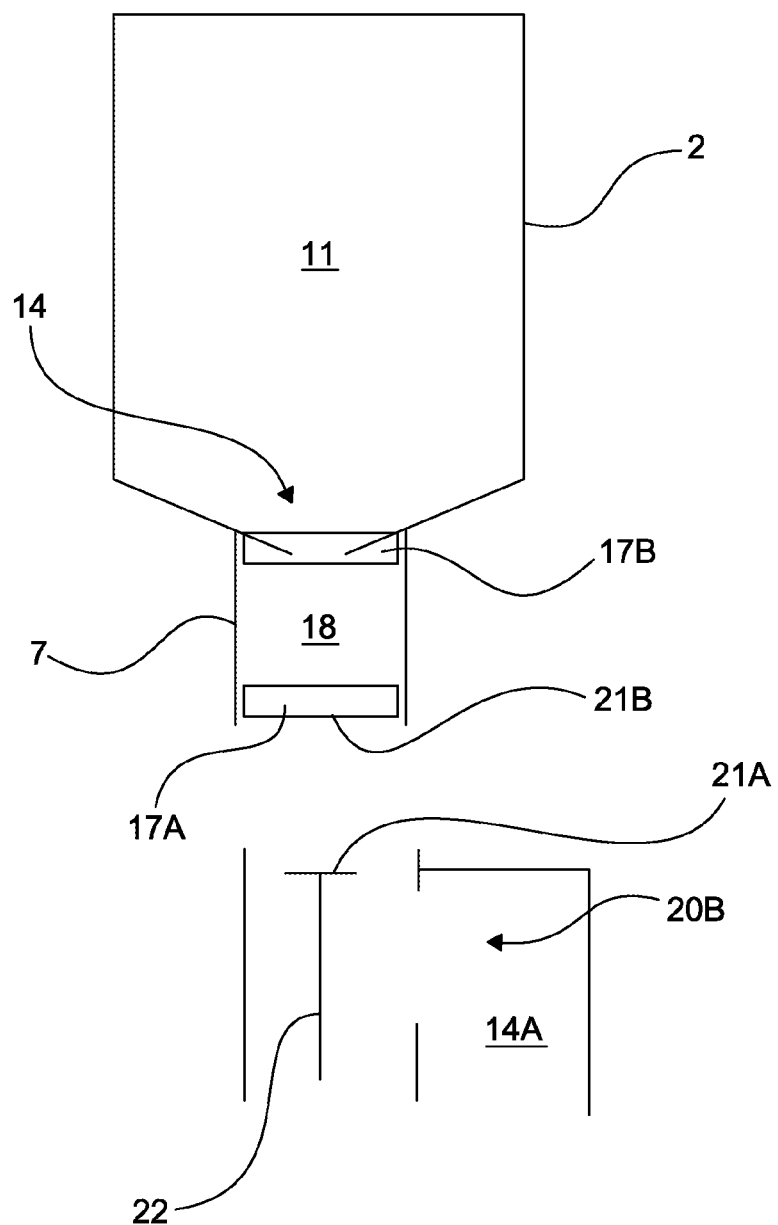
FIG. 4 shows in a schematic manner a system for dosing coffee beans.

In an embodiment, the receiving device 14 is, for instance, part of the package 2, as shown in FIG. 4, also when the package 2 and the apparatus 3 have not been coupled yet. The receiving device 14 extends, for instance, partly within the outlet 7. In a closed-off condition of the package 2, the receiving device 14 can, for instance, close off the outlet 7. The receiving device 14 comprises, for instance, the dosing space 18 and the dosing space wall 17, which wall 17 can comprise an upper boundary 17B and a lower boundary 17A, while the dosing space wall 17 can further function as closing means 10 for the outlet 7. For instance, the dosing space 18 may be driven by the apparatus 3, in particular the movement device 22, while the movement device 22 may be coupled with the dosing space wall 17, for instance by coupling elements 21A, 21B or otherwise. Preferably, the receiving device 14, or at least the diameter thereof, is so large as to allow multiple coffee beans to flow through it simultaneously side by side.

In an embodiment, the volume of the dosing space 18 may be adapted, for instance, for adapting the dose of coffee beans for one portion of coffee beverage. To this end, for instance, the distance between the walls 17 of the dosing space 18 and/or the distance between the walls 17 and the closing means 10 can be adapted. In an embodiment where the dosing space 18 is defined by the distance between the lower boundary 17A and the upper boundary 17B, the lower or upper boundary is, for instance, displaced with respect to the opposite upper or lower boundary, respectively, so that the dosing volume increases, or decreases. In another embodiment, the volume of the dosing space 18 may be adapted, for instance, in that the distance between the closing means 10 and the lower boundary 17A is adapted. For instance, to that end, a length-adjustable spacer 17D may be provided, which can make the distance between the lower boundary 17A on one side and the upper boundary 17B or the closing means 10 on the other increase or decrease. The spacer 17D may be, for instance, telescopable, screwable and/or extendable, and be controlled by a second movement device in the apparatus 3. To this end, for instance, a setting mechanism may be provided, with which the user himself can determine the dose of coffee beans to be supplied to the grinder 4. This setting mechanism may be provided in the package 2 and/or in the apparatus 3.

In the above description, a package 2 with at least one circumferential wall 8, a top wall 8A, a bottom 9 is described. It will be clear to one skilled in the art that an embodiment of the package 2 may be, for example, wholly spherical, or may be shaped differently, with the bottom 9 preferably sloping towards the outlet 7.

The coffee making apparatus in this example is arranged such that after preparing the coffee beverage substantially no unused ground coffee or coffee beans are left behind in the grinder 4 and/or in the coffee transport path 14A. To this end, in this example, the system is so arranged that, in use, the grinder 4 can only be stopped when at least substantially the whole amount of coffee beans supplied to the grinder 4 has been ground. This may be arranged for, for instance, by a control device, comprising a ground coffee and/or coffee bean detector, for instance, in the form of an optical, magnetic and/or a weight sensor.

FIGS. 5A-E show an embodiment of a part of the system 1 during different successive steps in a coffee bean delivery process. FIGS. 6A-E show detailed representations of FIGS. 5A-E, respectively. These figures show in particular the coffee bean receiving device 14 of the apparatus 3, in combination with the package 2.

In FIG. 5A there is shown a package 2 and a coffee bean receiving device 14 of an apparatus 3. The apparatus 3 is provided with a dosing space 18 with dosing space walls 17, movably arranged in a shaft 19. Furthermore, a coffee bean inlet 14A is shown, to which coffee beans can be delivered via the dosing space 18. The coffee bean inlet 14A can pass the coffee beans to the grinder 4 and/or to a sensor for measuring the amount of coffee beans, for example a weight or volume sensor. The dosing space wall 17 can comprise a spacer 17D. The dosing space wall 17 may further be provided with entries 31, through which coffee beans can flow from the package 2 into the dosing space 18. Furthermore, the dosing wall 17 may be provided with an exit 32, through which the coffee beans can flow from the dosing space 18 into the inlet 14A and/or to the grinder 4.

Figure 6F:
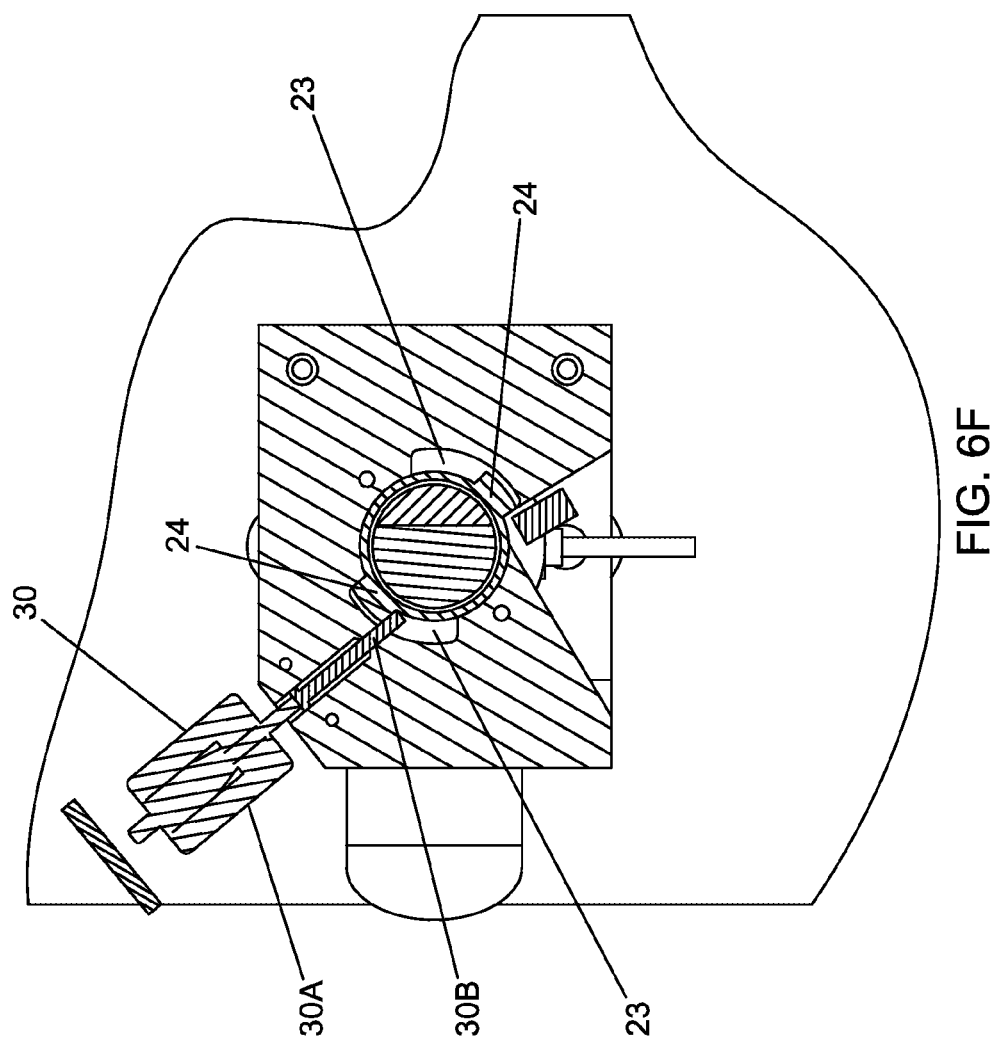
FIG. 6F shows a lock for fixing the package in the apparatus in top plan view.

The apparatus 3 may be provided with a first coupling element 23 which is arranged to be coupled with a first coupling part 24 of the package 2 (see also FIG. 6A). The first coupling part 24 of the package 2 may be provided near the outlet 7. In the example shown, the package 2 has approximately a bottle shape and the coupling element 25 is provided on the neck of the package 2. The cooperating first coupling element 23 and first coupling part 24 may be arranged, for example, as a bayonet closure. The apparatus 3 may be provided with a lock 30, with a detection system, a control 30A and a closing cam 30B (see FIG. 6F). The detection system may be arranged for detecting the coupling of the first coupling element 23 and the first coupling part 24. The control 30A may be arranged to control the closing cam 30B, for locking the coupling between the first coupling element 23 and the first coupling part 24. The detection system may be arranged to lock the first coupling element 23 and the first coupling part 24 if they are coupled with each other, and if the dosing space 18 is in motion for delivering coffee.

At the top of the dosing space 18, the apparatus 3 may be provided with a second coupling element 25 for coupling with the closing means 10 of the package 2. The closing means 10 may be provided with a corresponding second coupling part 26. In this way, the dosing space 18 and the closing means 10 may be coupled, if the package 2 and the apparatus 3 are coupled, in particular if the first coupling element 23 and the first coupling part 24 are coupled. The cooperating second coupling element 25 and second coupling part 26 may also be arranged as a bayonet closure. The closure 10 may be controlled by the dosing space 18 in open and closed position.

The first coupling element 23 can keep the package 2 in connected condition in place, while the second coupling element 25 connects the closing means 10 with the dosing space 18. The dosing space 18 can be moved as a kind of plunger through the shaft 19 and the outlet 7 into the package 2 (see for instance FIGS. 5C and 6C), with the closing means 10 being carried along.

Furthermore, the apparatus 3 is provided with a drive 27 for driving the dosing space 18 in vertical direction, from bottom to top and back. The drive 27 may be connected with the bottom 17A of the dosing space 18. The bottom 17A of the dosing space 18 can comprise a plunger that is driven by the drive 27, while the shaft 19 and the outlet 7 can serve as guide.

As may perhaps be seen more clearly in FIG. 6A, the closing means 10 can comprise a cap 28. In the embodiment shown, the cap 28 is provided with a safety stop 29 in the form of a spring leaf, which can prevent the possibility of the cap 28 being pulled out of the package 2. In another embodiment, the safety stop comprises, for example, a cam (see FIG. 10A).

In FIGS. 5B and 6B, the package 2 and the apparatus 3 are shown in coupled condition. The dosing space 18 is coupled with the cap 28, through the second coupling part 26, and the outlet 7 is coupled with the apparatus 3 through the second coupling part 24. In the position shown, the cap 28 closes off the outlet 7 and no coffee beans can be delivered from the package 2 to the dosing space 18.

In FIG. 5C and FIG. 6C it can be seen that the dosing space 18 extends partly in the inner space of the package 2, after having made an upward movement. The drive 27 has moved the dosing space 18 up, with the dosing space 18 with the cap 28 positioned into the inner space of the package 2. The entries 31 extend above the outlet 7 of the package 2. The exit 32 preferably does not extend above the outlet 7. Coffee beans 33 can flow under the influence of gravity through the entries 31 into the dosing space 18, but preferably not out of it via the exit 32. In the condition shown, the dosing space 18 may have filled up with coffee beans. As the coffee beans flow through the entries 31 into the dosing space 18, partly into the outlet 7, the height of the upper surface 34 of the collection of coffee beans in the package 2 can fall. As can be seen in the position shown, the exit 32 is not yet connected with the inlet 14A, so that the coffee beans 33 do not yet leave the dosing space 18. The position shown may, in this embodiment, be the highest position of the dosing space 18, for receiving coffee beans.

In FIGS. 5D and 6D, the dosing space 18 has been moved out of the package 2 again, such that the cap 28 closes off the package 2 again and the exit 32 is positioned adjacent the inlet 14A, for delivery of the coffee beans 33 to the grinder 4. The drive 27 has moved the dosing space 18 down through the outlet 7. During the movement of the dosing space 18 through the outlet 7, it may be that coffee beans are still present in the entries 31 of the dosing wall 17, between the dosing wall 17 and the outlet 7, or between the dosing wall 17 and the bottom 9. In such a case, the coffee beans may, for instance, be partly cut through, broken or pushed away by the dosing wall 17. For instance, the dosing wall 17 may be provided with a cutting wall 17E for cutting off beans between the outlet 7 and the cutting wall 17E (see FIG. 6A). In particular, the upper edge of the entry 31 can comprise a cutting wall 17E.

In FIGS. 5E and 6E it can be seen that the predetermined dose of coffee beans 33 can be delivered via the inlet 14A to the grinder 4. The dosing space 18 and the cap 28 are then in the initial position again as shown in FIGS. 5B and 6B, and a next predetermined dose of coffee beans can be taken off from the package 2 by moving the dosing space 18 into the package 2 again. In principle, the lock 30 can clear the package 2, in particular the coupling part 24, again, so that the package 2 can be taken off the apparatus 3.

In FIGS. 7A-7F, another embodiment is shown of the system 1, in particular the coffee bean receiving device 14 and the package 2, in successive steps of a coffee bean delivery process. FIGS. 8A-8D are detailed representations of FIGS. 7A-7D, respectively. In FIG. 7A the package 2 is still uncoupled from the apparatus 3. The package 2 may, in principle, be arranged in approximately the same way as the package 2 as described with reference to FIGS. 5A-5E and 6A-6E. The apparatus 3 and the package 2 may be provided with a corresponding first coupling element 23 and first coupling part 24, and a second coupling element 25 and second coupling part 26, for mutual coupling. Also, a lock 30 may be provided.

The dosing space 18 can further be arranged according to FIGS. 5A-5E and 6A-6E. The dosing space 18 is movably arranged in a movable shaft 19B. The movable shaft 19B is movably arranged in a stationary shaft 19A. The movable shaft 19B is provided with an exit opening 39 which can correspond with the exit 32 of the dosing space 18. Furthermore, at the inside of the stationary shaft 19A, a friction element 35 is provided, which offers resistance to movement of the movable shaft 19B (see FIG. 8A). The friction element 35 may comprise, for example, an elastomeric ring. In a further embodiment, the friction element is provided, for instance, in the outlet 7, and/or in both the outlet 7 and the stationary shaft 19A.

The drive 27 can move the dosing space 18 between a low (FIGS. 7B, 7E, 7F) and a high position (FIG. 7C). The bottom 17A of the dosing space 18 can comprise a plunger which is drive by the drive 27. The bottom 17A can comprise a carrier element 37 which is arranged to engage the movable shaft 19B and to carry along the movable shaft 19B upon moving up, against the resistance of the friction element 35.

In FIGS. 7B and 8B, a position is shown where the package 2 and the apparatus 3 are coupled. The dosing space 18 is positioned in the lowest position, and the cap 28 closes off the package 2. Above the surface 34 of the collection of coffee beans in the package 2, preferably an empty headspace 36 is present, also prior to first putting the package 2 into use. If the system 1 is activated for dispensing one cup of coffee, the dosing space 18 is moved up, into the inner space of the package 2. Initially, the movable shaft 19B is stopped by the friction element 35, so that the dosing space 18, and in particular the entries 31, end(s) up above the movable shaft 19B. Upon upward movement of the dosing space 18, the beans 33 are passed out of the inner space via the entries 31 into the dosing space 18. During the upward movement of the plunger, the carrier element 37 engages the movable shaft 19B so that the movable shaft 19B also moves up, preferably without closing off the entries 31.

Figure 8D:
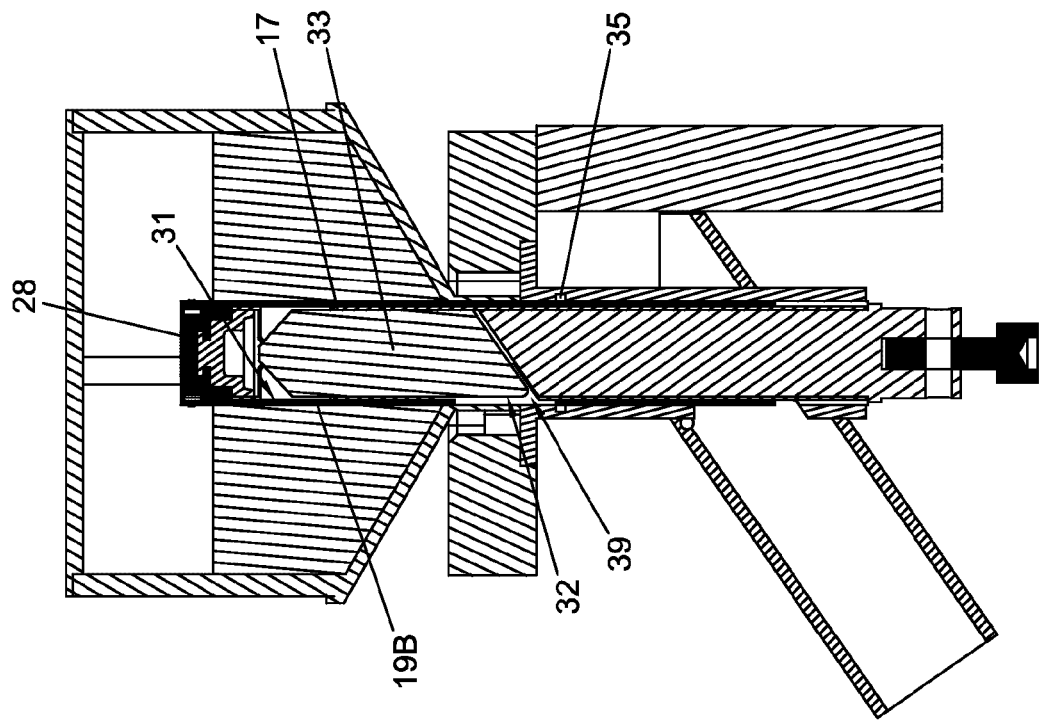
Figure 8C:
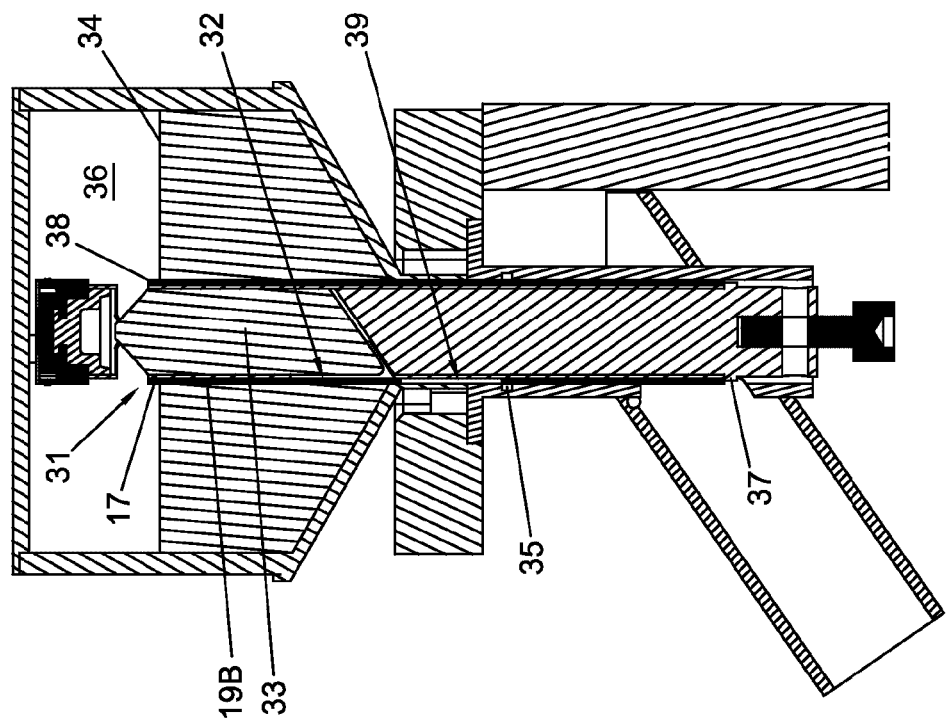

In FIGS. 7C and 8C a position is shown where the dosing space 18 is positioned in the uppermost position. The dosing space 18 is filled with coffee beans. The entries 31 to the dosing space 18, in this uppermost position, preferably extend wholly or partly above the top surface 34 of the beans. In the uppermost position, no coffee beans flow into or out of the dosing space 18 anymore. In moving up, the carrier element 37 has carried along the movable shaft 19B, whereby the movable shaft 19B covers the exit 32 of the dosing space 18, and the exit opening 39 of the movable shaft 19B extends below the exit 32. The upper edge 38 of the movable shaft 19B extends preferably above the surface 34 of the coffee beans. The speed of the movement of the dosing space may be tuned such that the dosing space 18 in each cycle carries along approximately the same predetermined dose of coffee beans, that is, given equal dimensions of the dosing space 18 and when the package 2 contains more than one predetermined portion of beans. The driving unit 27 is preferably arranged such that the cap 28 in the highest position extends approximately against or close to the top wall 8A, to be able to minimize the necessary free headspace 36.

In a next step, the dosing space 18 is moved down from the highest position (FIGS. 7D, 8D), so that the entries 31 are closed off again by the movable shaft 19B. Since in the highest position no further beans move into or out of the dosing space 18 anymore, the cap 28 and dosing space 18 can be moved down, in the movable shaft 19B, without beans needing to be broken off or cut. There are preferably no beans that can get stuck between the edges of the dosing space wall 17 and the movable shaft 19B. If the dosing space 18 extends in the movable shaft 19B again, the exit 32 and the exit opening 39 can overlap, as shown in FIGS. 7D and 8D, while the outlet 7 and/or the stationary shaft 19A can close off the exit 32 and the exit opening 39. The cap 28 and/or the dosing space 18 can carry along the movable shaft 19B downwards, against the resistance of the friction element 35, while the cap 28 can function, for example, as carrier element engaging an upper edge of the movable shaft 19B.

As shown in FIGS. 7E and 7F, the movable shaft 19B and the dosing space 18 can be moved down, until the exit 32 and the exit opening 39 are connected with the inlet 14A, so that the beans 33 in the dosing space 18 can be passed to the grinder 4. The dosing space 18 is in an initial position again as shown in FIG. 7B, so that the cycle can, in principle, start anew. Preferably, the system 1 is provided with a lock 30, as already described above (FIG. 6E), which can take care that the package 2 can only be taken off the apparatus 3 if the cap 28 closes off the package 2, as shown in FIGS. 7B, 7E and 7F.

In FIGS. 9A-9F there is shown yet another embodiment of at least a coffee bean receiving device part of the apparatus 3 and the package 2, in different positions according to successive steps in the bean delivery process.

Figure 9A:
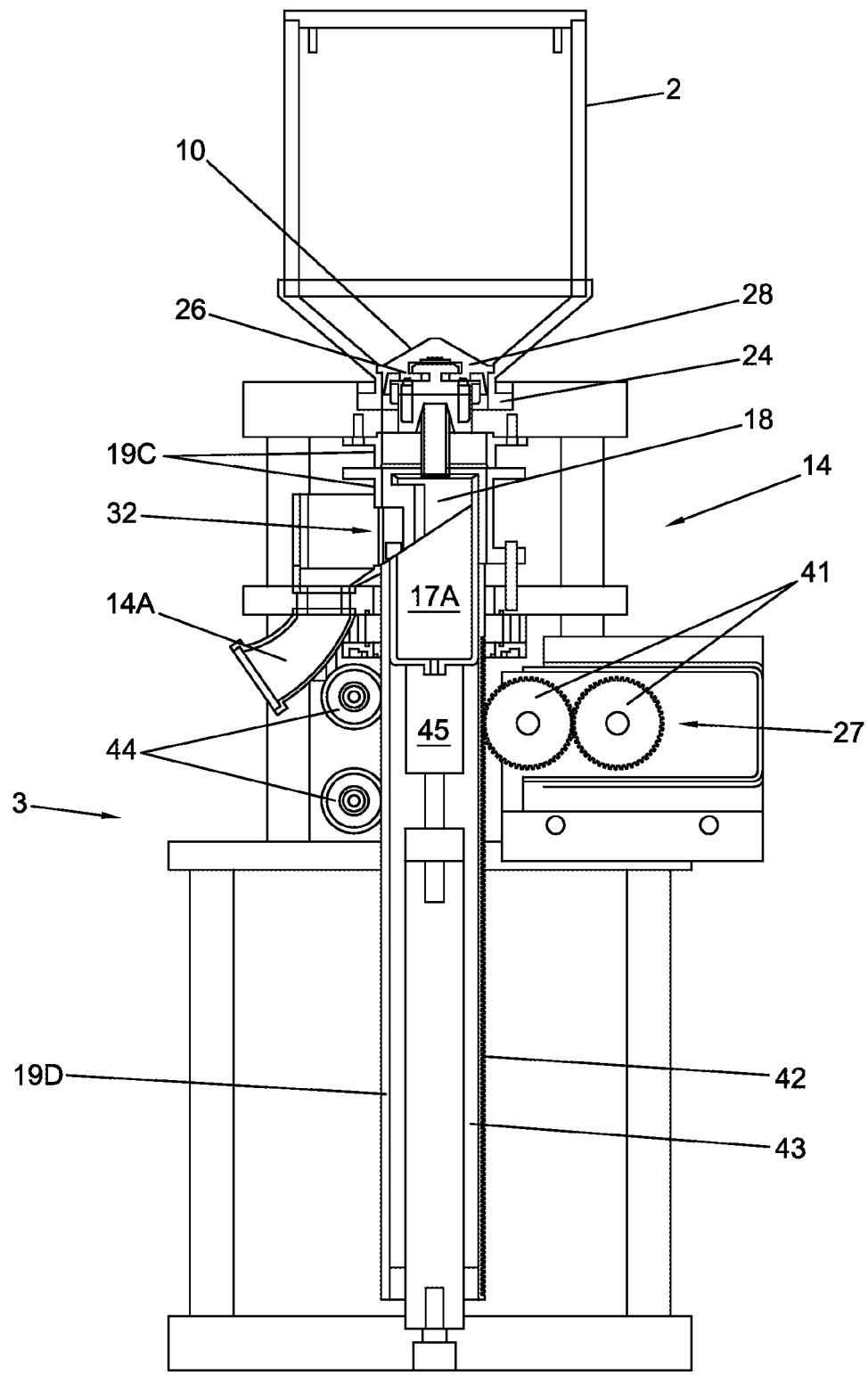
FIGS. 9A-F show in front view different positions of a further embodiment of the package and the coffee bean receiving device.

FIG. 9A shows the package 2 which is coupled with the apparatus 3. The package 2 may be approximately the same as the packages 2 described above. The package 2 may further be provided with approximately similar coupling parts 24, 26 to those already described above. The package 2 and the apparatus 3 may also be provided with corresponding coupling parts 24, 26 and coupling elements 23, 25 and be coupled with the apparatus 3 in approximately the same way as described above.

The apparatus 3 is provided with a static shaft 19C and a movable shaft 19D which is movably arranged within the static shaft 19C. The dosing space 18 is arranged to be movable with respect to the movable shaft 19D. At the same time, the dosing space 18 is clamped with respect to the movable shaft 19D through friction. In particular, the bottom 17A may be clamped in the movable shaft 19D through friction. In the embodiment shown, the movable shaft 19D and the dosing space 18 are so disposed that the exit 32 is cleared for any delivery of coffee beans to the grinder 4, along the inlet 14A.

The apparatus 3 may be provided with a drive 27 which is arranged to drive the movable shaft 19D in vertical direction. As is shown in FIG. 9A, the drive 27 may comprise gearwheels 41. Furthermore, the movable shaft 19D may be provided with a gear rack 42 which communicates with the gearwheels 41. A guide cylinder 43 and two guide wheels 44 can guide the movable shaft 19D in vertical direction. The guide cylinder 43 may be provided partly within the movable shaft 19D. Above the guide cylinder 43, or as a part of the guide cylinder 43, a lower stop 45 for the dosing space 18 may be provided.

Figure 9B:
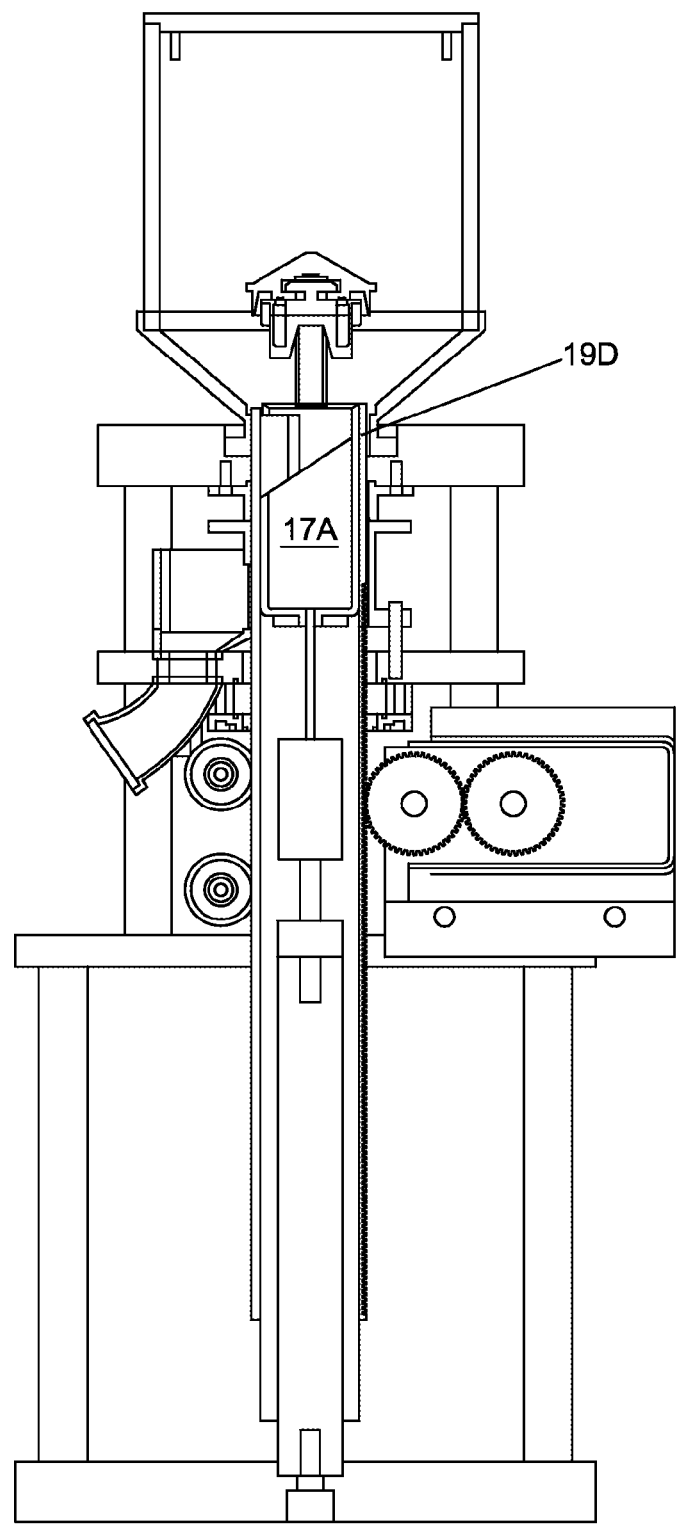
Figure 9C:
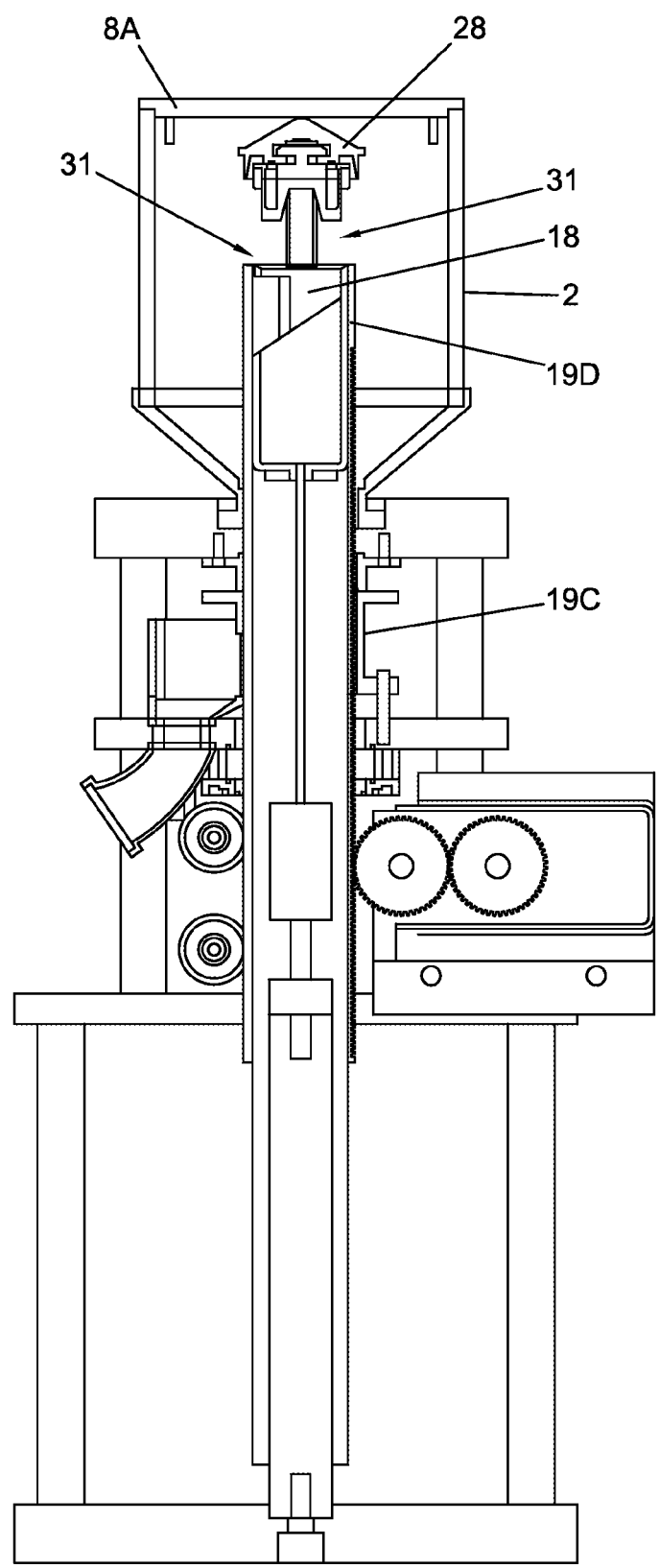

If the apparatus 3 is activated for delivering one cup of coffee, the movable shaft 19D is driven in a direction upwards, as shown in FIG. 9B. The movable shaft 19D carries along the dosing space 18 upwards through friction. As shown in FIG. 9C, the movable shaft 19D and the dosing space 18 are driven upwards until the cap 28 strikes against the top wall 8A of the package 2. During the upward movement the dosing space 18 has carried along a predetermined dose of coffee beans from the collection of coffee beans in the package 2. In the package 2 an empty headspace is present, which the upper edge of the movable shaft 19D and/or the lower edge of the entries 31 extend above if the dosing space 18 is in an upper position. In the upper position of the dosing space 18, in principle, no coffee beans will fall into or out of the dosing space 18 anymore, so that the movable shaft 19D can close off the entries 31 without any coffee beans getting stuck.

Figure 9D:
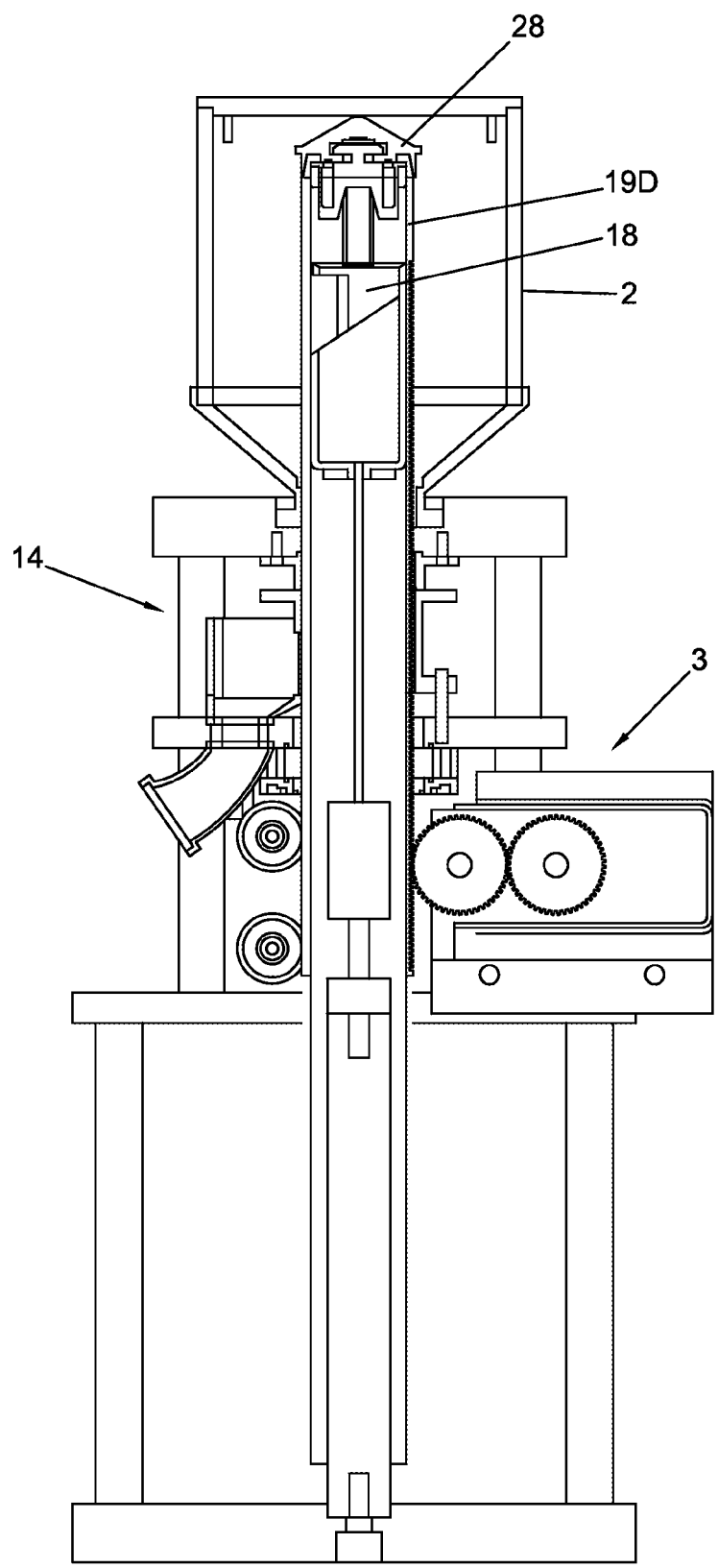
Figure 9E:
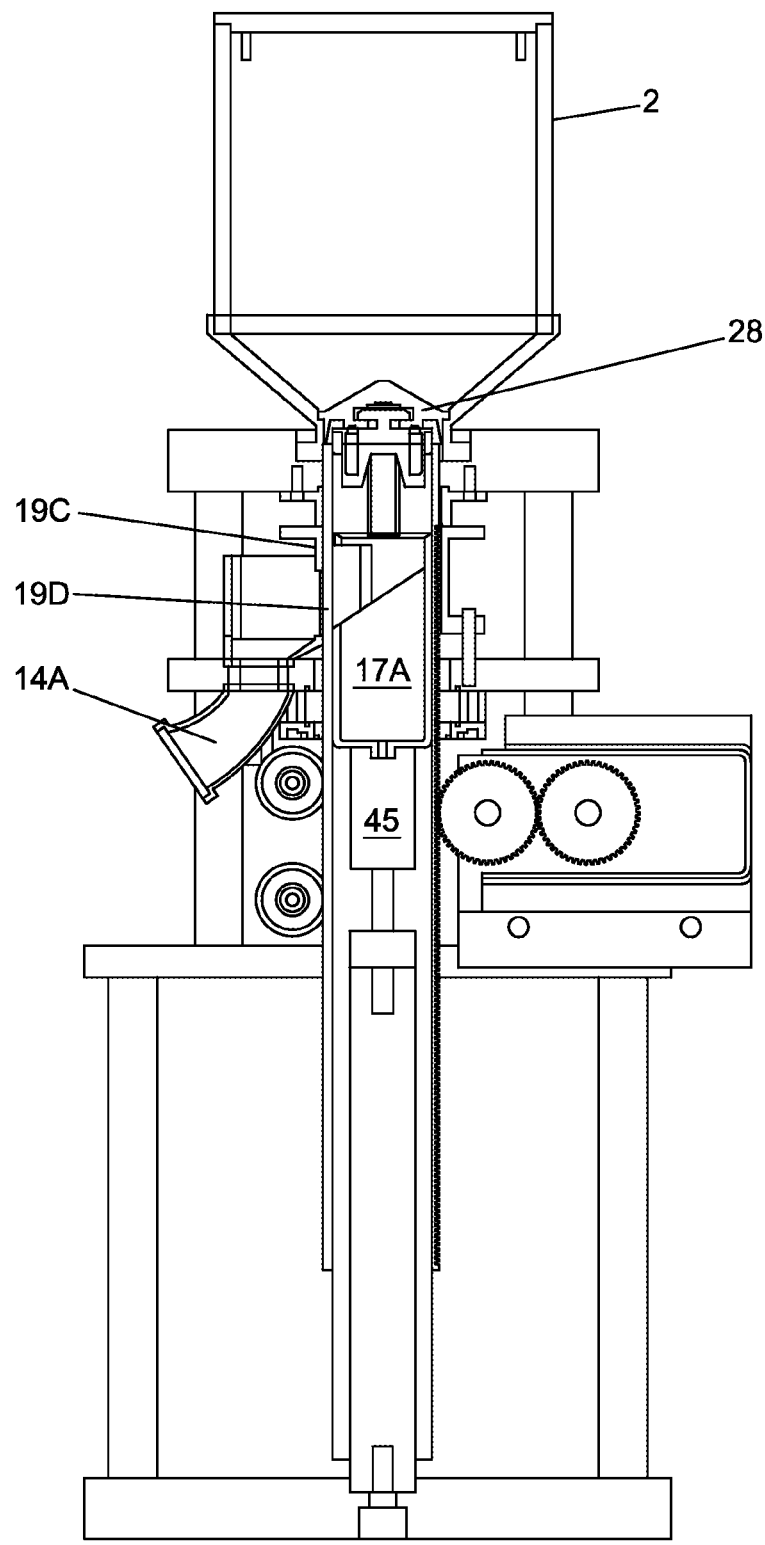

When the cap 28 is stopped by the top wall 8A, the movable shaft 19D can move up along the dosing space 18, against the friction of the dosing space 18 and/or bottom 17A. As can be seen in FIG. 9D, the movable shaft 19D is moved up until it connects with the cap 28, or at least closes off the dosing space 18. In principle, the movable shaft 19D may be driven, for instance, in a continuous movement from the lowermost to the uppermost position, with the dosing space 18 successively filling up with beans, halting at the top, and being closed off by the movable shaft 19D.

Figure 9F:
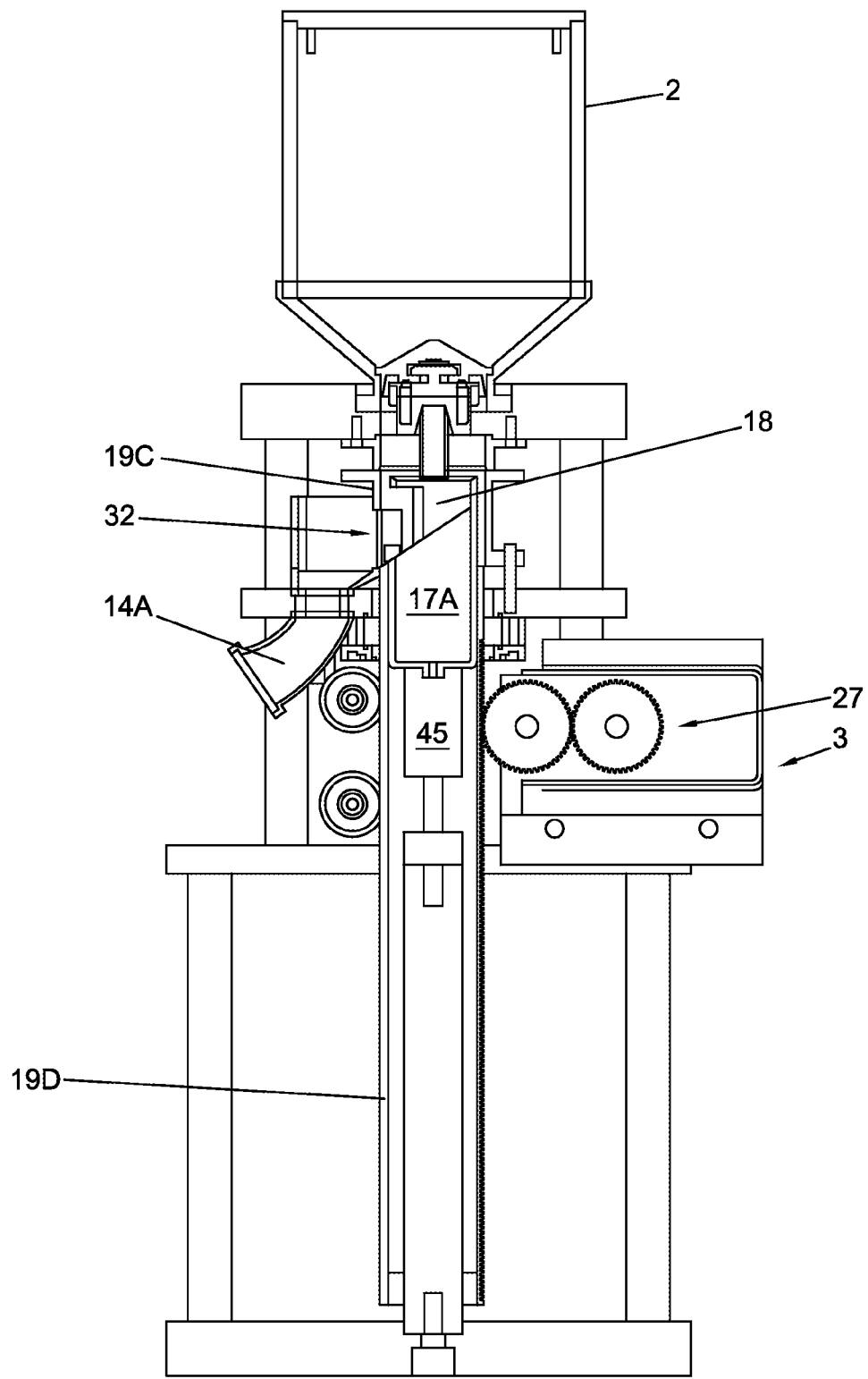

Since the coffee beans are then confined in the dosing space 18, the movable shaft 19D can be moved back down again (FIG. 9E) with the aid of the drive 27. The movable shaft 19D can move the dosing space 18 down along with it, preferably until the exit 32 of the dosing space 18 is adjacent the inlet 14A. The lower stop 45 stops the dosing space 18, in particular the bottom 17A of the dosing space, when the exit 32 is adjacent the outlet 14A, so that the movable shaft 19D moves further down, along the dosing space 18, against the friction, until the exit 32 is cleared and the predetermined dose of coffee beans can be delivered from the dosing space 18 to the grinder 4 (FIG. 9F).

In an embodiment, the upper boundary 17B of the dosing space 18 and/or the coupling element 23 is open, such that from above coffee beans can flow into the dosing space 18 when the apparatus 3 is not coupled with the package 2. For instance in a position where the package 2 is not coupled with the apparatus 3, coffee beans can be passed directly into the dosing space 18 and further be passed directly to the grinder 4. However, the apparatus 3 can preferably be put into operation only when the package 2 is coupled, so that the grinder 4 preferably does not grind the supplied beans and the supplied beans moreover have not been dosed by the apparatus 3.

In FIGS. 10A-D there is shown an embodiment of the package 2. This package 2 is suitable inter alia to cooperate with the apparatuses 3 as described partly with reference to FIGS. 5-9. The package 2 is shown upside down, with the outlet 7 facing up. The package 2 has a bottle shape, with the bottom 9 of the package 2 having a relatively conical shape. The package 2 may be composed from a bottle 47, the cap 28 with the second coupling part 26, a ring 46 with the first coupling part 24, and a sealing foil 48 which can close off the package 2 airtightly prior to use (FIG. 10A). The bottle 47 comprises, for instance, substantially polyethylene terephthalate (PET) or other plastic material, while the package 2 may be manufactured through injection molding and/or blowing in a mold.

The first coupling part 24 can comprise a cam. The first coupling part 24 may be attached to the outlet 7, for instance, through a ring profile 46 or otherwise. The ring profile 46 may be placed as a U-section over the edge 49 of the outlet 7 and be coupled with the bottle 47. The ring profile 46 can in principle form the outlet 7 of the package 2.

The cap 28 is provided with second coupling parts 26 which may be arranged a receiving parts of a bayonet closure, for receiving cam-shaped second coupling elements 25 which may be connected with the dosing space 18. Furthermore, the cap 28 may be provided with a safety stop 29, which can have a cam shape. The safety stop 29 can prevent the possibility that, once placed in the bottle 47, the cap 28 can readily fall out of the outlet 7 of the bottle and/or be taken out of it. Furthermore, the bottle 47 may be provided with local protrusions 50 in which the end of the safety stop 29 fits. As a result, the cap 28 can be moved deeper in the direction of the outlet 7 without being stopped by the bottle neck wall. In another embodiment, the protrusions 50 offer room for the second coupling elements 25 which engage in the second coupling parts 26 and make a rotation stroke to be coupled with the cap 28. In FIGS. 10B, C and D there are shown, respectively, a front, side and top plan view of the assembled package 2 according to FIG. 10A.

Preferably, the closing means 10 closes off the package 2 from inside. At each delivery of beans, the closing means 10 is opened inwards, and subsequently placed in a closing position against the outlet 7 again. In an embodiment, coupling elements 25 corresponding with the closure 10 are necessary to be able to open the package 2. The coupling elements 25 can engage the closing means 10 and press it towards the inside. This can prevent the possibility of coffee beans being passed into or out of the package 2 in an uncoupled condition of the package 2.

In an embodiment, the package 2 can also function without top wall 8A, for instance, so that the package 2 can be replenished. The top wall 8A can comprise, for instance, a detachable and/or hinged cover, a diaphragm, or foil or the like, for instance, so that the package 2 can be replenished. In another embodiment, no top wall 8A or cover is present. For instance, in a particular embodiment, the package 2 is only provided with a bottom 9, an outlet 7, and a coupling part 24 and/or 26.

In an embodiment, the apparatus 3 is activated by engagement of the first and/or second coupling parts 24 and/or 26 on the coupling elements 23 and/or 25. The apparatus 3 may be provided with a detection system that switches the apparatus 3 on when the package 2 is coupled. Only in switched-on condition will the apparatus 3 deliver coffee beans and dispense coffee. In another embodiment the coupling parts 24 and/or 26 of the package 2 comprise a kind of retractable fingers or the like which are arranged to be temporarily coupled with the coupling elements 23 and/or 25 for putting the system 1 into operation via the detection system. In a further embodiment, for instance, a key is provided which does not per se comprise a part of or a whole package 2, which puts the apparatus 3 into operation via the detection system. For instance, this key is provided with coupling parts 24 and/or 26, or click fingers or other detection system activating elements. In one of these manners, the apparatus 3 could be activated without package 2 and/or without second coupling parts 26 and coffee beans could be supplied to the dosing space 18, for instance, via guide wall 9A.

In a further embodiment, not shown, the cap 28 may be designed without second coupling parts 26. The cap 28 can then be pushed open, for instance, by a static or moving part of the apparatus 3, such as a movably arranged dosing space 18 or the like.

The above-described and many comparable variations, as well as combinations thereof, are understood to be within the framework of the invention outlined by the claims. Of course, different aspects of different embodiments and/or combinations thereof can be combined with each other and interchanged within the framework of the invention. Thus, there should be no limitation to just the embodiments mentioned.

The invention claimed is:

1. A coffee bean package comprising:
   at least one circumferential wall, a top wall, a bottom, and an outlet, near the bottom, with the walls and bottom enclosing an inner space,
   a coupling part for coupling, and uncoupling, the coffee bean package with an apparatus provided with a grinder, and
   reclosable closing means preventing coffee beans in the coffee bean package being exposed to ambient air,
   wherein the bottom is provided with at least one tapering wall part so that in a condition coupled with an upstanding apparatus, coffee beans flow automatically towards the coffee bean outlet under the influence of gravity, and the closing means are provided with a second coupling part for coupling and uncoupling with the apparatus;
   wherein the coffee bean package comprises a partly movably arranged coffee bean receiving device for supplying coffee beans out of the coffee bean package, the coffee bean receiving device being provided with a dosing space for holding a predetermined dose of coffee beans.

2. The coffee bean package according to claim 1, wherein the closing means are provided with a sloping top so that coffee beans on the top side slide down along the closing means.

3. The coffee bean package according to claim 1, wherein the inner space of the coffee bean package is partly filled with coffee beans so that in connected condition of the coffee bean package an upper part of the inner space is free of coffee beans.

4. An apparatus comprising:
   a coffee bean grinder,
   a partly movably arranged coffee bean receiving device for supplying coffee beans from a coffee bean package to the grinder, which coffee bean receiving device is provided with a dosing space for holding a predetermined dose of coffee beans, and
   a coupling part for coupling and uncoupling with a corresponding guide part of the coffee bean package so that the coffee bean receiving device can be coupled with a coffee bean outlet of the coffee bean package and uncoupled,
   wherein the coffee bean receiving device is arranged to be guided in coupled condition through the coffee bean outlet of the coffee bean package into the inner space of the coffee bean package for letting coffee beans from the coffee bean package into the dosing space, and to be guided back out of the inner space for supplying the dose of coffee beans from the dosing space to the grinder and wherein the coffee bean receiving device is provided with a coupling part for coupling and uncoupling closing means of the package.

5. A method for dosing coffee beans, the method comprising:
   coupling a coffee bean package having a coffee bean outlet and coffee beans with an apparatus provided with a coffee bean grinder, the coffee bean package having reclosable closing means;
   guiding a coffee bean receiving device defining a dosing space at least partly through the coffee bean outlet into the inner space of the coffee bean package so that a dose of coffee beans flows into the dosing space defined by the coffee bean receiving device, wherein the coffee bean receiving device is provided with a coupling part for coupling and uncoupling the reclosable closing means of the package, and wherein the coffee bean receiving device filled with the dose of coffee beans moves back through the coffee bean outlet out of the inner space of the coffee bean package, and feeds the respective dose of coffee beans outside the coffee bean package to the grinder,
   after at least one dose of coffee beans has been supplied to the grinder, closing the outlet of the coffee bean package and uncoupling the coffee bean package;
   wherein coupling the coffee bean package to the apparatus includes coupling the closing means to the dosing device by way of the coupling part.

* * * * *